(12) United States Patent
Osawa et al.

(10) Patent No.: US 11,316,569 B2
(45) Date of Patent: Apr. 26, 2022

(54) USER TERMINAL AND RADIO COMMUNICATION METHOD

(71) Applicant: NTT DOCOMO, INC., Tokyo (JP)

(72) Inventors: Ryosuke Osawa, Tokyo (JP); Hiroki Harada, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/484,164

(22) PCT Filed: Feb. 8, 2018

(86) PCT No.: PCT/JP2018/004296
§ 371 (c)(1),
(2) Date: Aug. 7, 2019

(87) PCT Pub. No.: WO2018/147346
PCT Pub. Date: Aug. 16, 2018

(65) Prior Publication Data
US 2019/0356371 A1   Nov. 21, 2019

(30) Foreign Application Priority Data

Feb. 10, 2017   (JP) .............................. JP2017-023400

(51) Int. Cl.
*H04B 7/06* (2006.01)
*H04W 16/28* (2009.01)
(Continued)

(52) U.S. Cl.
CPC .......... *H04B 7/0617* (2013.01); *H04B 7/063* (2013.01); *H04B 7/0639* (2013.01);
(Continued)

(58) Field of Classification Search
CPC .......................... H04B 7/0695; H04W 52/146
See application file for complete search history.

(56) References Cited

U.S. PATENT DOCUMENTS

2005/0202859 A1* 9/2005 Johnson ............... H04B 7/0408
455/575.7
2006/0264184 A1* 11/2006 Li ........................ H04B 7/0695
455/101

(Continued)

OTHER PUBLICATIONS

International Search Report issued in PCT/JP2018/004296 dated May 15, 2018 (1 page).

(Continued)

*Primary Examiner* — Kevin Kim
(74) *Attorney, Agent, or Firm* — Osha Bergman Watanabe & Burton LLP

(57) ABSTRACT

To suppress continuation of deterioration of communication quality due to beam failure, also in the case of using beam forming in both transmission and reception, a user terminal according to one aspect of the present invention is characterized by having a control section that controls a transmission beam, and a transmission section that transmits a signal using the transmission beam, where when the control section updates the transmission beam, the transmission section transmits information about transmission beam update, using an updated transmission beam.

4 Claims, 11 Drawing Sheets

(51) Int. Cl.
   *H04W 72/04*   (2009.01)
   *H04W 88/02*   (2009.01)
   *H04W 24/04*   (2009.01)

(52) U.S. Cl.
   CPC ....... *H04W 16/28* (2013.01); *H04W 72/0413* (2013.01); *H04W 88/02* (2013.01); *H04W 24/04* (2013.01)

(56) References Cited

U.S. PATENT DOCUMENTS

| | | | |
|---|---|---|---|
| 2016/0119910 A1* | 4/2016 | Krzymien | H04W 72/046 370/329 |
| 2018/0191422 A1* | 7/2018 | Xia | H04B 7/061 |
| 2018/0254809 A1* | 9/2018 | Huang | H04B 7/0695 |
| 2018/0279286 A1* | 9/2018 | Akoum | H04W 72/046 |
| 2019/0199412 A1* | 6/2019 | Koskela | H04W 72/0446 |
| 2020/0053800 A1* | 2/2020 | Deng | H04L 5/0048 |

OTHER PUBLICATIONS

Written Opinion of the International Searching Authority issued in PCT/JP2018/004296 dated May 15, 2018 (4 pages).
Samsung; "Trigger condition for beam failure recovery"; 3GPP TSG RAN WG1 Meeting #88, R1-1702939; Athens, Greece; Feb. 13-17, 2017 (5 pages).
NTT Docomo, Inc.; "Views on mechanism to recover from beam failure"; 3GPP TSG RAN WG1 Meeting #88, R1-1702799; Athens, Greece; Feb. 13-17, 2017 (5 pages).
Extended European Search Report issued in counterpart European Patent Application No. 18751795.8, dated Dec. 4, 2020 (10 pages).
CATT; "Discussion on beam recovery"; 3GPP TSG RAN WG1 AH_NR Meeting, R1-1700225; Spokane, USA; Jan. 16-20, 2017 (3 pages).
MediaTek; "Aspects for UE-initiated beam recovery"; 3GPP TSG RAN WG1 Meeting #88, R1-1702730; Athens, Greece; Feb. 13-17, 2017 (5 pages).
Nokia, Alcatel-Lucent Shanghai Bell; "Beam Recovery in NR"; 3GPP TSG RAN NR Ad-Hoc Meeting, R1-1701092; Spokane, USA; Jan. 16-20, 2017 (5 pages).

* cited by examiner

USER TERMINAL AND RADIO COMMUNICATION METHOD

TECHNICAL FIELD

The present invention relates to a user terminal and radio communication method in the next-generation mobile communication system.

BACKGROUND ART

In UMTS (Universal Mobile Telecommunications System) networks, for the purpose of higher data rates, low delay and the like, Long Term Evolution (LTE) has been specified (Non-patent Document 1). Further, for the purpose of wider bands and higher speed than LTE (also referred to as LTE Rel.8 or 9), LTE-A (LTE-Advanced, also referred to as LTE Rel.10, 11, or 12) has been specified, and successor systems (e.g. also referred to as FRA (Future Radio Access), 5G (5th generation mobile communication SYSTEM), NR (New Radio), NX (New radio access), FX (Future generation radio access), LTE Rel.13, 14 or 15 onward) to LTE have been studied.

In the existing LTE system (e.g. LTE Rel.8-13), communication on downlink (DL) and/or uplink (UL) is performed, using a subframe (also referred to as Transmission Time Interval (TTI) and the like) of 1 ms. The subframe is a transmission time unit of one channel coded data packet, and is a processing unit for scheduling, link adaptation, retransmission control (HARQ: (Hybrid Automatic Repeat reQuest) and the like.

Further, in the existing LTE system (e.g. LTE Rel.8-13), a user terminal (UE: User Equipment) transmits uplink control information (UCI) using an uplink control channel (e.g. PUCCH (Physical Uplink Control Channel) and/or uplink data channel (e.g. PUCCH (Physical Uplink Shared Channel)). The format of the uplink control channel is also called the PUCCH format.

The UCI includes at least one of scheduling request (SR), retransmission control information (also called HARQ-ACK (Hybrid Automatic Repeat reQuest-Acknowledge), ACK/NACK (Negative ACK) and the like) for DL data (DL data channel) (PDSCH: Physical Downlink Shared Channel), and channel state information (CSI).

CITATION LIST

Non-Patent Literature

[Non-patent Literature 1] 3GPP TS 36.300 V8.12.0 "Evolved Universal Terrestrial Radio Access (E-UTRA) and Evolved Universal Terrestrial Radio Access Network (E-UTRAN); Overall description; Stage 2" "(Release 8)", April, 2010

SUMMARY OF INVENTION

Technical Problem

In future radio communication systems (e.g. 5G, NR), it is expected to actualize various radio communication services so as to meet respective different requirements (e.g. ultra-high speed, high capacity, ultra-low delay, and the like).

For example, in NR, it is studied to offer radio communication services called eMBB (enhanced Mobile Broad Band), mMTC (massive Machine Type Communication), URLLC (Ultra Reliable and Low Latency Communications) and the like.

Further, in NR, for the main purpose of reducing difficulty in securing coverage with the carrier frequency increased, and decreasing radio wave propagation loss, it is studied to use beam forming (BF) in both reception and reception.

In the case of applying BF, the case is expected that continuation of communication is difficult due to a combination of transmission/reception beams under use. For example, in the case where the UE and/or base station rotates, shifts and the like, and in the case where an obstruction (shield, e.g. train and the like) suddenly arises between the UE and the base station, there is the risk that the quality of the beam deteriorates and that the communication link is disconnected.

It is required to recover from such beam failure as quickly as possible. However, there is the problem that deterioration of the communication quality is not improved promptly by beam recovery methods that have previously been studied.

The present invention was made in view of such a respect, and it is an object of the invention to provide a user terminal and radio communication method capable of suppressing continuation of deterioration of communication quality due to beam failure, also in the case of using beam forming in both transmission and reception.

Solution to Problem

A user terminal according to one aspect of the present invention is characterized by having a control section that controls a transmission beam, and a transmission section that transmits a signal using the transmission beam, where when the control section updates the transmission beam, the transmission section transmits information about transmission beam update, using an updated transmission beam.

Advantageous Effect of the Invention

According to the present invention, also in the case of using beam forming in both transmission and reception, it is possible to suppress continuation of deterioration of communication quality due to beam failure.

DESCRIPTION OF EMBODIMENTS

Figures 1A, 1B:
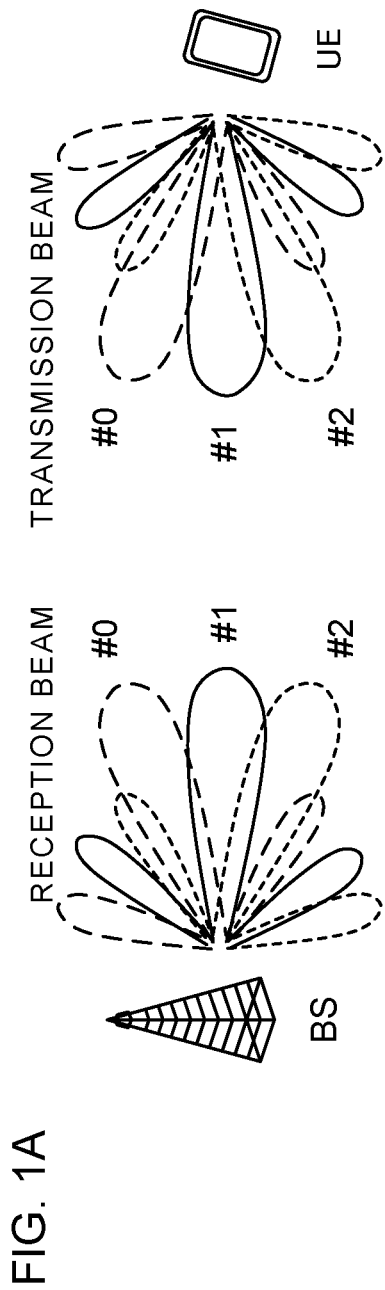
FIGS. 1A and 1B are diagrams showing one example of a beam pair.

In future radio communication systems (e.g. NR), for the main purpose of reducing difficulty in securing coverage with the carrier frequency increased, and decreasing radio wave propagation loss, it is studied to use beam forming (BF) in both reception and reception. For example, using an ultra-multi-element antenna, BF is techniques for forming a beam (antenna directivity), by controlling amplitude and/or phase of a signal transmitted/received from/in each element (also called precoding). In addition, MIMO (Multiple Input Multiple Output) using such an ultra-multi-element antenna is also called massive MIMO.

It is possible to classify BF into digital BF and analog BF. The digital BF is a method of performing pre coding signal processing on baseband (digital signal). In this case, parallel processing of Inverse Fast Fourier Transform (IFFT)/Digital to Analog Converter (DAC)/RF (Radio Frequency) is required corresponding to the number of antenna ports (or RF chains). On the other hand, it is possible to form the number of beams corresponding to the number of RF chains at any timing.

The analog BF is a method of using a phase shift device in RF. In the analog BF, it is not possible to form a plurality of beams at the same timing, but since it is only required to rotate the phase of the RF signal, the configuration is easy and is actualized at lost cost.

In addition, it is also possible to achieve a hybrid BF configuration by combining the digital BF and analog BF. In NR, it is studied to introduce massive MIMO, and when beam forming with the extremely high number is performed only by the digital BF, the circuit configuration is expensive. Therefore, it is expected to use the hybrid BF configuration in NR.

In NR, it is studied that both the base station (also called BS (Base Station), Transmission/Reception Point (TRP), eNB (eNode B), gNB and the like) and UE form transmission/reception beams to acquire gain.

The transmission beam and/or reception beam may be determined based on propagation path information estimated, for example, using a reference signal. The reference signal may be Cell-specific Reference Signal (CRS), Channel State Information-Reference Signal (CSI-RS), Sounding Reference Signal (SRS) and the like, or may be a separately defined reference signal (e.g. Beam-specific Reference Signal (BRS) specific to a beam (varying with beams)).

For example, the propagation path information is Channel Station Information (CSI), information about channel characteristic and/or channel matrix and the like. In addition, the propagation path information may include transmitter/receiver characteristics of the UE and BS, phase and/or amplitude adjustment result for beam forming and the like. For example, the transmitter/receiver characteristics refer to frequency characteristics (e.g. phase and/or amplitude characteristics) of the transmitter/receiver.

In addition, the propagation path information may be at least one of Channel Quality Indicator (CQI), Precoding Matrix Indicator (PMI), Precoding Type Indicator (PTI), Rank Indicator (RI) and the like. In addition, the PMI determined by the BS may be called TPMI (Transmitted PMI).

The BS receives an uplink reference signal transmitted from the UE, performs channel estimation and the like based on the uplink reference signal, and may derive uplink propagation path information. The UE receives a downlink reference signal transmitted from the BS, performs channel estimation and the like based on the downlink reference signal, and may derive downlink propagation path information.

It is preferable that the BS and UE are capable of identifying a beam that the communicating party uses. For example, the BS and UE may share information about a combination (combination of a transmission beam on the transmission side and a reception beam on the reception side) of a transmission/reception beam pair. In this case, the BS may notify (indicate) the UE of a beam pair, and using the transmission beam associated with the notified beam pair, the UE may perform transmission (and/or reception using the reception beam). The combination of a transmission/reception beam pair may be called Beam Pair Link (BPL).

The information about the combination of a transmission/reception beam pair may be notified to the UE and/or the BS, using higher layer signaling (e.g. RRC signaling, MAC (Medium Access Control) signaling (e.g. MAC Control Element (MAC CE), broadcast information and the like), and physical layer signaling (e.g. Downlink Control Information (DCI), Uplink Control Information (UCI)) or a combination thereof.

FIGS. 1A and 1B are diagrams showing one example of the beam pair. FIG. 1A shows one example of transmission beams of UE and reception beams of BS, and FIG. 1B shows one example of Beam Pair Indexes (BPI) indicative of a combination of transmission/reception beams. FIG. 1A illustrates three transmission beams (that correspond to transmission beam (Tx beam) indexes #0 to #2) available in the UE, and three reception beams (that correspond to reception beam (Rx beam) indexes #0 to #2) available in the BS.

In FIG. 1B, pairs of the transmission beam index of the UE and the reception beam index of the BS shown in FIG. 1A are respectively associated with BPIs #0 to #8. In addition, all pairs of available transmission/reception beams may not be identified by the BPI.

In addition, in the present Description, it is assumed that the beam is distinguished (differences of a plurality of beams are determined) by at least one of the following (1) to (8), but the present invention is not limited thereto: (1) resources (e.g. time and/or frequency resources, the number of resources and the like); (2) antenna port (e.g. port number of DMRS (DeModulation Reference Signal) and/or Sounding Reference Signal (SRS), the number of ports, resources that correspond to the port, and the like); (3) precoding (e.g. the presence or absence of precoding, precoding weight); (4) transmit power; (5) phase rotation; (6) beam width; (7) angle of the beam (e.g. tilt angle); and (8) the number of layers.

Further, the term of "beam" used in the present Description may be used changeably with at least one of the above-mentioned (1) to (8), and for example, the "beam" may be read with "resources", "antenna port", "DMRS port", "SRS port", "antenna port of the reference signal" and the like.

The DMRS port is an antenna port of the demodulation reference signal (DMRS) of the DL signal (e.g. DL data channel and/or DL control channel), and may uniquely correspond to the beam. In addition, different DMRS ports may be different from one another in at least one of a sequence of DMRS, frequency resources, time resources and coding resources (e.g. Orthogonal Cover Code (OCC)) to which the DMRS is allocated, and/or Cyclic Shift (CS).

For example, the SRS port may be a port of SRS used in measurement of UL, and may uniquely correspond to the beam. The UE may be set to use different transmission beams for each reference signal (e.g. DMRS, SRS) resource, or may use the same transmission beam in a plurality of ports in one reference signal resource.

The UE may be set for information on a combination of resource and port of the reference signal (e.g. DMRS, SRS). Further, the UE may be set for information (e.g. frequency resources (density in the frequency domain and the like), time resources (the number of symbols, timing, periodicity and the like)) on the resource of the reference signal.

In addition, the reference signal in the present Description may be transmitted and/or received based on the same configuration (setting) as in the reference signal with the same name in the existing LTE (e.g. LTE Rel.13), or may be transmitted and/or received based on a different configuration. Further, for example, the DMRS, SRS and the like may be called NR-DMRS, NR-SRS and the like, respectively.

The beam may be identified using different directivity (precoding matrix) applied to the same reference signal (e.g. DMRS, SRS). The beam may be identified by Beam Index (BI), PMI, TPMI, port index of a predetermined reference signal (e.g. DMRS Port Index (DPI), SRS Port Index (SPI), resource indicator of a predetermined reference signal (e.g. CSI-RS Resource Indicator (CRI), DRMS Resource Index, and SRS Resource Index) and the like.

The BS may notify the UE of information (e.g. beam index, TPMI and the like) about the transmission beam and/or reception beam. The UE may autonomously determine the transmission beam and/or reception beam to use.

Whether or not the UE is capable of autonomously determining the beam may be judged based on beam correspondence relation information. The beam correspondence may be an indicator concerning matching of the transmission beam and the reception beam, and may be called transmission/reception beam correspondence (Tx/Rx beam correspondence), beam reciprocity, beam calibration, Calibrated/Non-calibrated, reciprocity calibrated/non-calibrated, correspondence degree, matching degree, simply correspondence, and the like.

For example, the presence or absence of correspondence may be judged as "presence" in the case where the first beam and second beam completely match with each other, or may be judged as "presence" in the case where a difference between both the beams is a certain threshold or within an allowable range. Further, the degree of correspondence may be a value calculated from the difference between both the beams. In addition, the difference between beams may be a difference obtained from beam identification information, and for example, may be at least one of a difference between beam indexes, a difference between beam coefficients, a difference between angles of beams, and the like.

When there is correspondence in the UE, the BS and/or the UE may assume that the following (1) and/or (2) is met: (1) the UE is capable of determining a transmission beam of the UE for uplink transmission, based on downlink measurement of the UE using at least one or more reception beams of the UE; and (2) the UE is capable of determining a reception beam of the UE for downlink reception, based on instructions of the BS based on uplink measurement of the BS using at least one or more transmission beams of the UE.

Further, when there is correspondence in the BS, the BS and/or the UE may assume that the following (3) and/or (4) is met: (3) the BS is capable of determining a reception beam of the BS for uplink reception, based on downlink measurement of the UE using at least one or more transmission beams of the BS; and (4) the BS is capable of determining a transmission beam of the BS for downlink transmission, based on uplink measurement of the BS using at least one or more reception beams of the BS.

The UE may notify the BS of UE capability information on whether or not the UE has the beam correspondence capability. In the case where the UE has the beam correspondence capability, the UE is capable of determining a suitable uplink transmission beam from the downlink reference signal. In this case, since the BS does not need to notify the UE of information to designate the transmission beam, for example, it is possible to reduce overhead required for the downlink control signal (TPMI).

Particularly, in the case of performing subband precoding (also called subband precoding, frequency selective precoding and the like) on a precoding weight independently for each subband, since the BS needs to notify the UE of the TPMI for each subband, from the viewpoint of communication amount reduction, it is effective that the UE determines the transmission beam.

The UE and/or the BS may hold propagation path information that corresponds to each BPI as shown in FIG. 1B, and may determine a transmission beam and/or a reception beam to use, based on the propagation path information that corresponds to each BPI. For example, the propagation path information that corresponds to each BPI may be acquired by beam sweeping of the UE and the BS. In beam sweeping, a plurality of beams (e.g. a plurality of beams with different directivity) is switched in different time region and/or different frequency region and is transmitted.

A signal and/or channel transmitted by sweeping may be an arbitrary signal, and for example, may be at least one of the reference signal, synchronization signal, random access preamble, control signal and data signal, or a combination thereof. Further, a signal and/or channel transmitted in each beam may be the same, or may be different for each beam.

In addition, when the above-mentioned BF is applied, the case is expected that continuation of communication is difficult in a transmission/reception beam pair under use. For example, in the case where the UE and/or the BS rotates, shifts and the like, and in the case where an obstruction (which may be called a shield, and for example, may be a train and human body (hand, face, body and the like)) suddenly arises (blockage/blocking) between the UE and the BS, there is the risk that the quality of the beam deteriorates and that the communication link is disconnected. As well as such shadowing, when fading (e.g. multipath fading, frequency and/or time selective fading, another cell and/or interference from another cell) affects, the same problem may occur.

Figure 2:
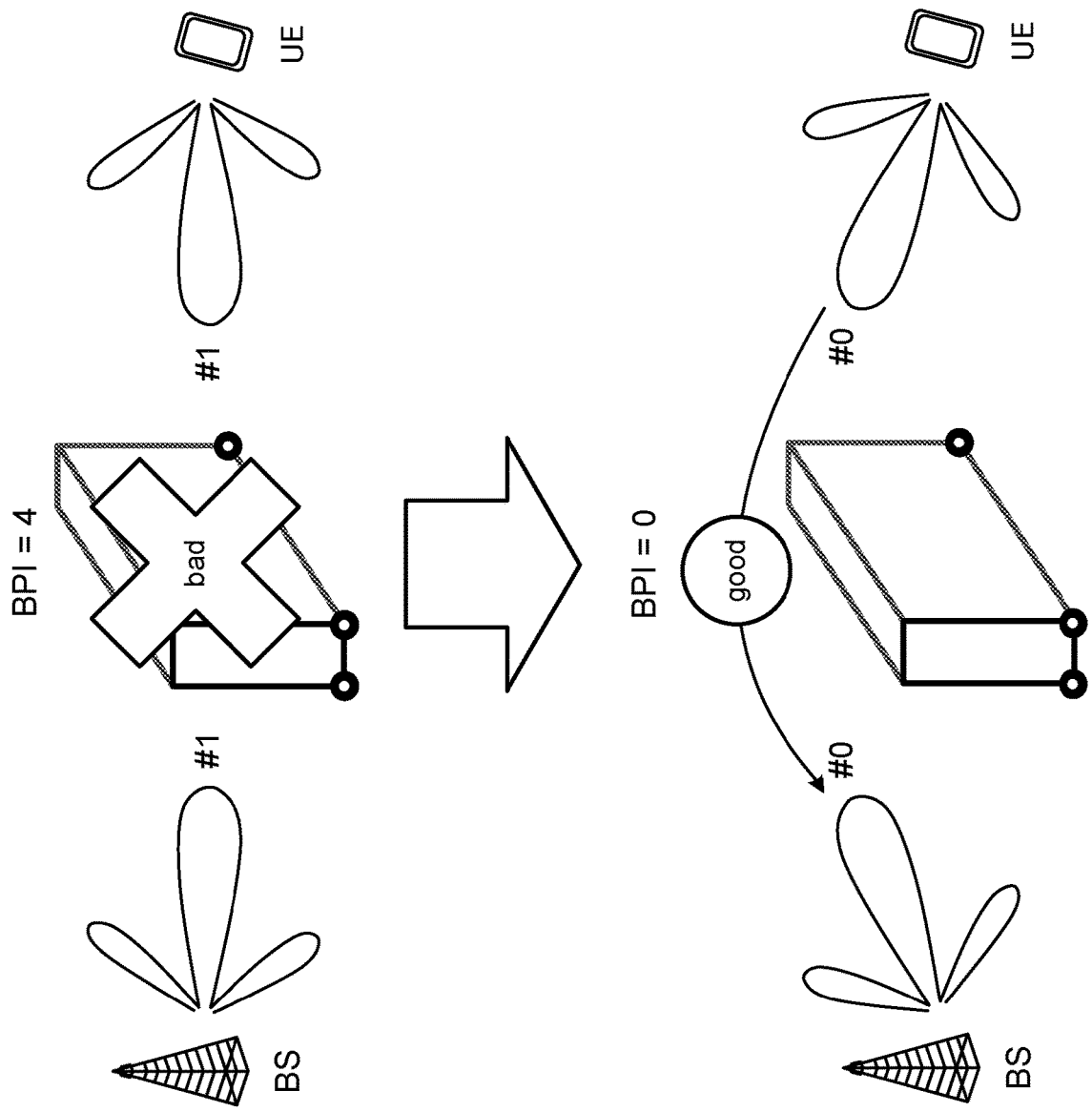
FIG. 2 is a diagram showing one example of beam failure and beam recovery.

It is required to recover from such beam failure as quickly as possible. FIG. 2 is a diagram showing one example of beam failure and beam recovery. In this example, it is assumed that beam pairs shown in FIGS. 1A and 1B are available. In addition, in the present Description, hereinafter, similarly, explanation will be given on the premise that the beam pair as shown in FIGS. 1A and 1B is set, and is applicable to the present invention also when different beam settings are used.

The upper portion of FIG. 2 illustrates an example where a communication state deteriorates due to an obstruction during communication with BPI=4 (BS reception beam=#1, UE transmission beam=#1). In this case, the BS and UE switch to transmission/reception beams (e.g. BPI=0 (BS reception beam=#0, UE transmission beam=#0)) hard to undergo the effect of the obstruction (lower portion in FIG. 2), respectively, by beam recovery, and are thereby capable of suppressing the effect of beam failure.

As a method of beam recovery, for example, in the case where the UE does not receive feedback from the BS on the signal transmitted with the transmission beam for a certain time, it is considered that the UE determines that uplink using the transmission beam is disconnected and performs uplink connection again.

However, for re-connection on uplink, since the random access procedure is required, there is the problem that a long time is required for recovery. Further, since random access channel (PRACH: Physical Random Access Channel) resources are consumed for random access, in an environment where a plurality of UEs performs beam recovery frequently, there is the risk that it is not possible to properly start the random access procedure.

On the other hand, for beam recovery, it is considered that the UE changes the transmission beam without instructions from the BS. In this case, the BS does not recognize that the UE changes the transmission beam, and therefore, does not update the reception beam. As a result, although the uplink is not disconnected, since the BS does not change to an optimal reception beam, the communication quality still deteriorates.

Figure 3:
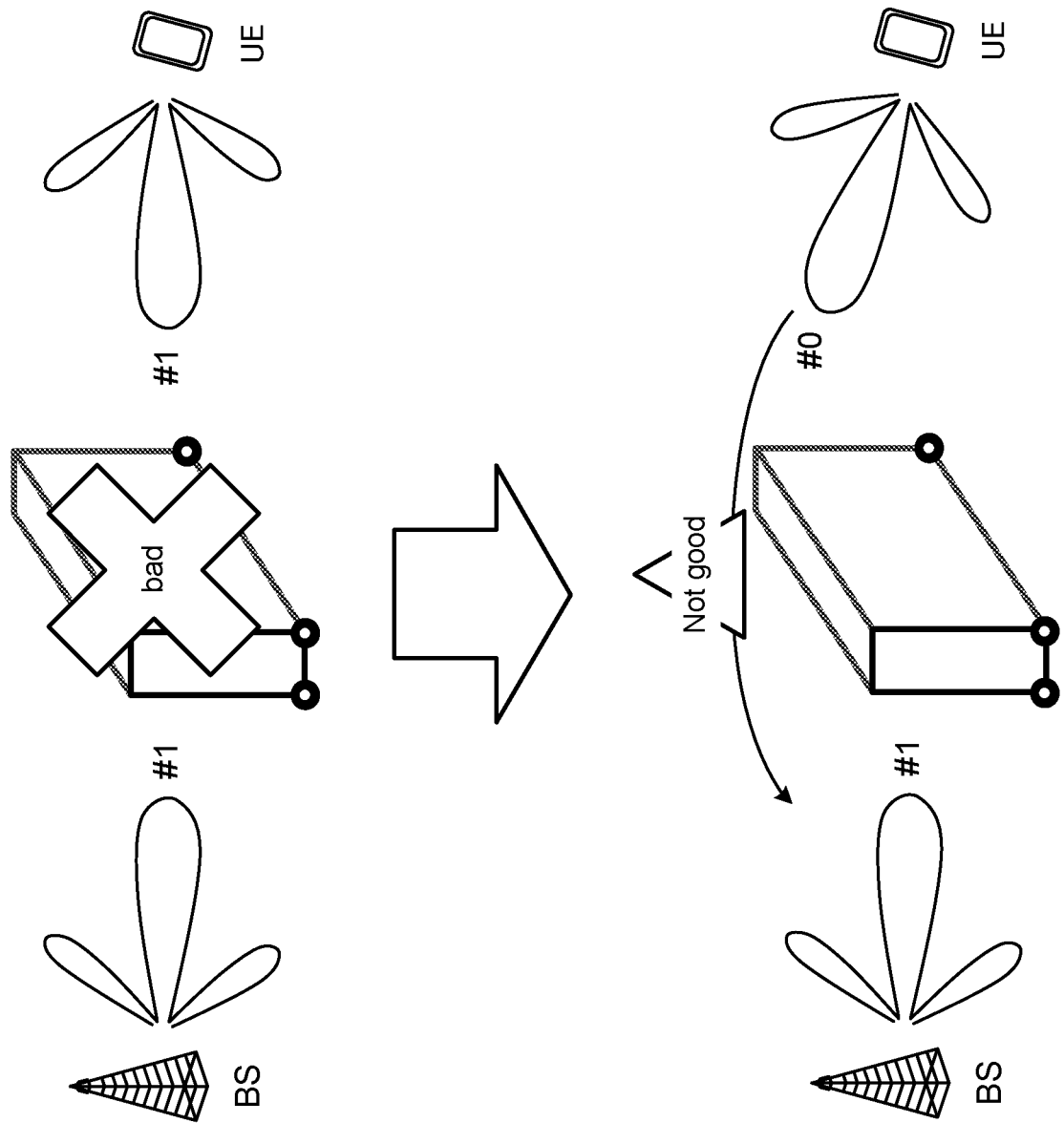
FIG. 3 is a diagram showing one example of the problem in the case where UE autonomously changes a transmission beam to perform beam recovery.

FIG. 3 is a diagram showing one example of the problem in the case where the UE autonomously changes the transmission beam to perform beam recovery. The upper portion of FIG. 3 illustrates an example where a communication state deteriorates due to an obstruction during communication with BPI=4 (BS reception beam=#1, UE transmission beam=#1).

In this case, the UE switches to a transmission/reception beam (e.g. UE transmission beam=#0) hard to undergo the effect of the obstruction (lower portion in FIG. 2) by beam recovery, and is thereby capable of suppressing the effect of beam failure. However, the BS does not recognize that the UE changes the transmission beam from #1 to #0, and uses the reception beam #1 without change. In this example, it is not possible to promptly use an optimal beam pair (beam pair that corresponds to BPI=0 shown in FIG. 2).

As described above, the beam recovery method that has previously been studied is incapable of promptly improving deterioration of the communication quality. Therefore, the inventors of the present invention conceived a beam recovery method capable of suppressing continuation of deterioration of communication quality due to beam failure.

According to one Aspect of the present invention, also when the UE changes a transmission beam without instructions from the BS, the BS is capable of changing to a suitable reception beam, and of improving the communication quality. Further, by allowing a transmission beam determination without notification from the BS, it is possible to reduce the downlink control signal (e.g. TPMI). Further, since PRACH transmission is not performed again in beam failure, it is possible to recover the beam in a short time and saved resources.

Embodiments according to the present invention will be described below in detail with reference to drawings. A radio communication method according to each Embodiment may be applied alone, or may be applied in combination.

(Radio Communication Method)

In one Embodiment of the present invention, when the UE updates (changes) a transmission beam, the UE transmits information about the transmission beam update (hereinafter, also called transmission beam update information) to the BS, using the changed transmission beam. The UE may notify of the transmission beam update information, using higher layer signaling (e.g. RRC signaling, MAC signaling), physical layer signaling (e.g. UCI) or combination thereof.

The transmission beam update information may include a certain index. The certain index may be an index related to the beam (beam before update and/or beam after update), and for example, may be any of a reception beam index of the BS, transmission beam index of the UE and BPI or combination thereof. The reception beam index of the BS may indicate a reception beam expected to be the best quality in making a beam pair with the updated transmission beam of the UE.

In addition, instead of the beam index or as well as the beam index, the UE may notify of another indicator (e.g. PMI, DPI and the like) indicative of the beam.

In the case where transmission/reception beam sweeping is beforehand performed and the BS already knows an optimal reception beam for each transmission beam, based on the certain index notified from the UE, the BS is capable of determining the optimal beam to update.

The transmission beam update information may include information indicating that the beam is changed, instead of the above-mentioned certain index or as well as the above-mentioned certain index. The BS may perform beam sweeping, using reception of the transmission beam update information as a trigger, and may identify the changed transmission beam of the UE and a suitable reception beam that corresponds to the changed transmission beam. Herein, in the case of using digital BF, by applying a plurality of reception beams to a buffered received signal, the BS is capable of performing beam sweeping, without requiring additional time and frequency resources.

The transmission beam update information may include sweeping request information to request beam sweeping, information indicating that the beam paring (transmission beam and/or reception beam) is not suitable (e.g. the quality deteriorates, update is required, and the like) and the like.

Figure 4:
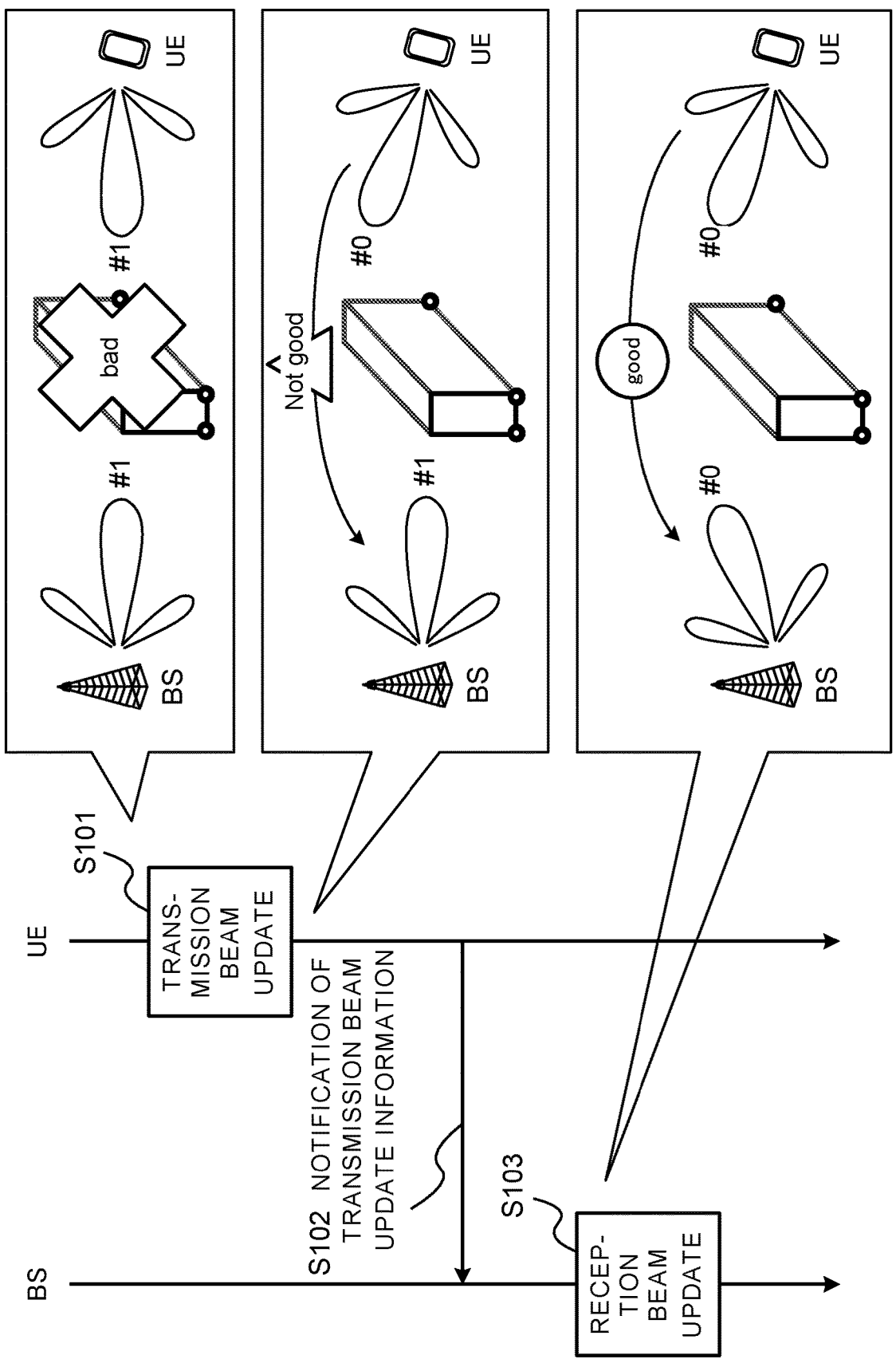
FIG. 4 is a diagram showing one example of a flow of beam recovery using transmission beam update information according to one Embodiment of the present invention.

FIG. 4 is a diagram showing one example of a flow of beam recovery using the transmission beam update information according to one Embodiment of the present invention. The UE autonomously updates the transmission beam (step S101). The autonomous update may be performed, for example, as a trigger, using that receipt confirmation information (e.g. also referred to as HARQ-ACK, ACK/NACK and the like) of HARQ (Hybrid Automatic Repeat reQuest) to a certain UL signal (e.g. UL data) is not received during a certain period (is not received the certain number of times).

Further, the autonomous update may be performed when the quality of the current beam pair is less than a certain threshold. For example, the quality of the beam pair may be determined by RSRP (Reference Signal Received Power)), RSRQ (Reference Signal Received Quality), RSSI (Received Signal Strength Indicator), SNR (Signal to Noise Ratio), SINR (Signal to Interference plus Noise Ratio) and the like.

FIG. 4 illustrates, on the right side, an example where a communication state deteriorates due to an obstruction during communication with BPI=4 (BS reception beam=#1, UE transmission beam=#1). Herein, it is assumed that the UE updates the transmission beam from #1 to #0.

By update of the transmission beam of the UE, although the reception beam of the BS is not optimal yet, it is expected that the communication quality is improved to be better than before update. Using the updated transmission beam, the UE notifies the BS of the transmission beam update information (step S102). In step S102, the UE may also notify the BS of the quality information of the beam pair.

In addition, for a period during which a predetermined condition is met (e.g. a predetermined period elapses, the UE receives HARQ-ACK from the BS, and the like) after step S101, the UE may increase transmit power as compared with before the beam update. For example, after step S101, the UE may apply at least one of transmit power increase only for the PUSCH, transmit power increase only for the PUCCH, and transmit power increase only for resources (e.g. resources of UCI including the transmission beam update information) to transmit the transmission beam update information.

Herein, these increase widths (increase amount, degree of increase) of transmit power may be defined by specification, or may be set on the UE by higher layer signaling (e.g. RRC signaling).

Upon receiving the transmission beam update information transmitted from the UE, the BS updates the reception beam of the BS (step S103). In this example, the BS updates from the reception beam #1 to #0. By this means, it is possible to properly improve the communication quality on uplink between the UE and the BS.

In addition, in the case where the BS does not receive a signal from the UE for a predetermined time (period), the BS may search by sweeping the reception beam. Further, in the case where uplink is not recovered, the BS may transmit a signal (e.g. PDCCH order) to cause the UE to perform the random access procedure.

<Transmission of Transmission Beam Update Information on PUSCH>

In the case of transmitting the transmission beam update information by UCI, the UCI may be transmitted using at least one of the PUCCH and the PUSCH. In this case, it is possible to notify the BS of transmission beam update for a short time by the physical layer, and the BS is capable of changing the reception beam early.

In the case of using the PUSCH, since it is possible to use resources already designated by UL grant (DCI (e.g. DCI format 0, 4 and the like)) for scheduling of uplink data transmission), the need for additional radio resources is eliminated to notify of the transmission beam update information.

In addition, in the case where the UE is capable of notifying of the transmission beam update information on the PUSCH, the BS is required to monitor whether or not the UCI is transmitted on the PUSCH in a blind manner. However, it is a burden on the BS to monitor all the PUSCHs.

Therefore, transmission of the transmission beam update information may be limited by any of the following (1) to (3) or combination thereof: (1) limitation on transmission-capable resources; (2) limitation on transmission-capable PUSCH; and (3) limitation on transmission-capable UE. By this means, it is possible to reduce a resource amount that the BS should monitor.

In regard to the above-mentioned (1), the BS may beforehand set the UE for information on resources to transmit the transmission beam update information by higher layer signaling (e.g. RRC signaling, MAC signaling). The information on resources to transmit the transmission beam update information may be information on time resources (e.g. subframe index, slot index, periodicity and the like), may be information on frequency resources (PRB index, the number of PRBs, PRB periodicity and the like), or may be a combination thereof.

For example, the resources to transmit the transmission beam update information may be set at subframes #0 and #5 inside each radio frame. In the case where the PUSCH scheduled by UL grant corresponds to resources to transmit the transmission beam update information, the UE may transmit the transmission beam update information on the PUSCH.

In addition, the UE may be set for information on resources in which the transmission beam update information is not transmitted by higher layer signaling. In this case, when the PUSCH scheduled by UL grant does not correspond to the resources in which the transmission beam update information is not transmitted, the UE may transmit the transmission beam update information on the PUSCH. The BS may monitor the PUSCH that does not correspond to the resources in which the transmission beam update information is not transmitted to receive the transmission beam update information.

In regard to the above-mentioned (2), the BS may include information (field) indicative of availability of transmission beam update information notification in DCI (UL grant) to transmit. The field may be represented by a one-bit width. The UE may transmit the transmission beam update information on the PUSCH which corresponds to the UL grant indicating that transmission beam update information notification is allowed. The BS may expect that the transmission beam update information is notified only on the PUSCH indicated to the UE to allow the transmission beam update information notification.

In regard to the above-mentioned (3), the BS may expect that the UE capable of notifying of the transmission beam update information is limited to UEs that have the beam correspondence capability. In other words, the BS may expect that the UE is capable of transmitting the transmission beam update information in the case of having the beam correspondence capability, and that the UE is incapable of transmitting the information in the case of not having the capability.

In consideration of the above-mentioned (1) to (3), the UE may determine whether or not the UE is capable of notifying of the transmission beam update information in PUSCH resources indicated by the UL grant, based on at least one of higher layer signaling, physical layer signaling, and UE capability information of the terminal.

In addition, the UE may transmit the transmission beam update information on UL grant-free PUSCH. Herein, the UL grant-free PUSCH is a method studied for NR to transmit the PUSCH (UL data) without UL grant, and is also called UL grant-free UL transmission, UL grant-less UL transmission, contention-based UL transmission and the like. By using the UL grant-free PUSCH, contention of UL transmission of a plurality of user terminals is allowed, and it is expected to reduce delay time until transmission of UL data is started.

Transmission of the transmission beam update information using the UL grant-free PUSCH may be limited based on the above-mentioned (1) and/or (3). Further, resources for the UL grant-free PUSCH may be limited to certain resources (e.g. certain time and/or frequency resources). Information on the resources for UL grant-free PUSCH may be set on the UE by higher layer signaling (e.g. RRC signaling, MAC signaling). The information on the resources may be information on time resources and/or information on frequency resources.

Transmission of the transmission beam update information using the UL grant-free PUSCH may be permitted only in particular resources among the resources for the UL grant-free PUSCH. For example, information on resources for the UL grant-free PUSCH for enabling transmission of the transmission beam update information may be set on the UE by higher layer signaling (e.g. RRC signaling, MAC signaling). The information on the resources may be information on time resources and/or information on frequency resources.

Figure 5A:
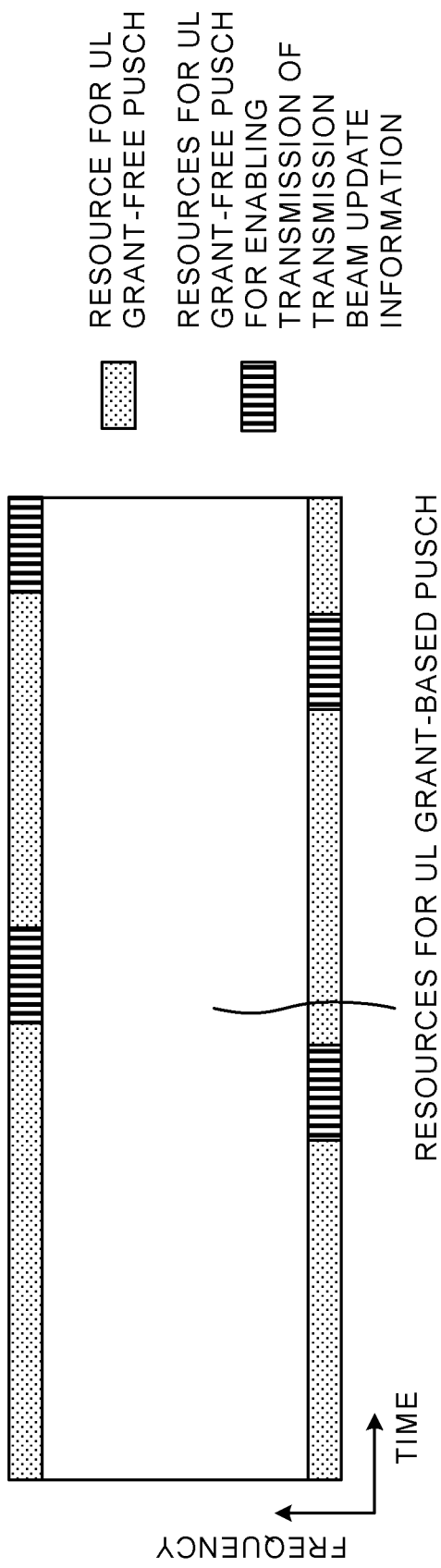
FIGS. 5A and 5B are diagrams showing one example of resources of UL grant-free PUSCH.
Figure 5B:
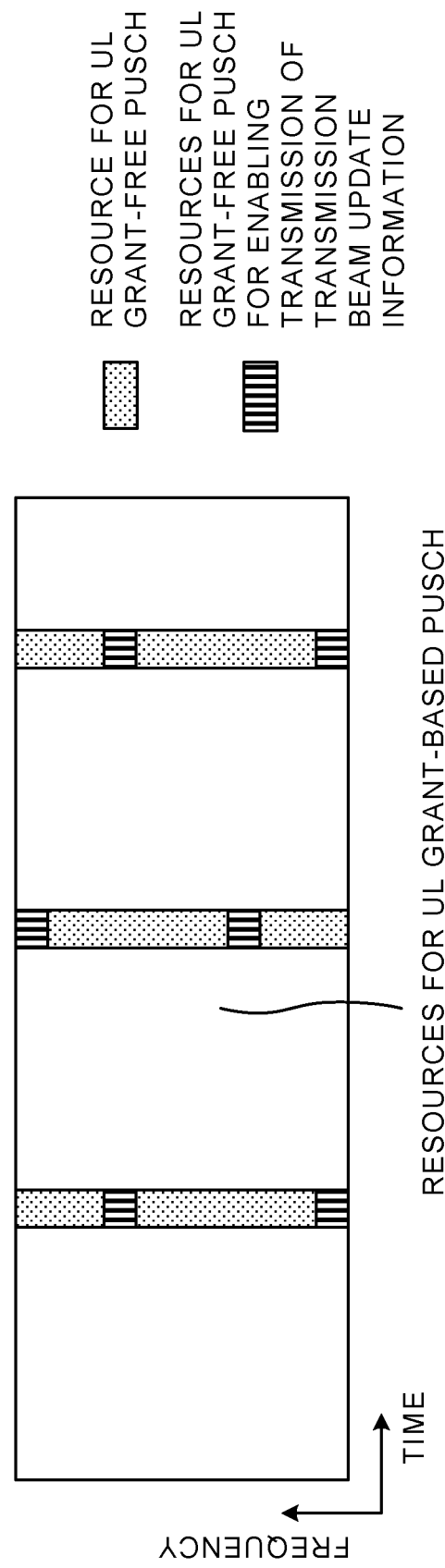

FIGS. 5A and 5B are diagrams showing one example of resources of the UL grant-free PUSCH. FIG. 5A illustrates an example where it is possible to allocate the UL grant-free PUSCH to opposite ends in the frequency region shown in the figure, but is not limited thereto. Further, frequency resources for the UL grant-base PUSCH and frequency resources for a plurality of UL grant-free PUSCHs are subjected to Frequency Division Multiplexing (FDM), but the invention is not limited thereto. For example, as shown in FIG. 5B, these resources may be subjected to Time Division Multiplexing (TDM).

Further, the UL grant-free PUSCH may be reserved in contiguous time resources as shown in FIG. 5A, or may be allocated to discontiguous (intermittent) time resources as shown in FIG. 5B.

In this example, among resources for the UL grant-free PUSCH, a part of the resources is allocated as resources for enabling transmission of the transmission beam update information. As shown in the figure, among the resources for the UL grant-free PUSCH, the resources for the UL grant-free PUSCH for enabling transmission of the transmission beam update information may be set at different pluralities of time and/or frequency resources.

According to one Embodiment of the present invention as described above, also in the case where the UE changes the transmission beam without instructions from the BS, the BS is capable of changing to a suitable reception beam to improve the communication quality.

<Modification>

In addition, it is described that the transmission beam update information is notified using the transmission beam updated by the UE, but the invention is not limited thereto. For example, the transmission beam update information may be transmitted in a carrier different from the carrier (cell, CC) using the transmission beam. It is suitable for the case where the UE is capable of communicating with a plurality of CCs by Carrier Aggregation (CA) and/or Dual Connectivity (DC).

Each Embodiment as described above illustrates the case of transmitting the transmission beam update information to the BS in the case where the UE updates the transmission beam, but is not limited thereto. For example, in the case where the BS updates the transmission beam, the BS may transmit the transmission beam update information to the UE. For example, in the description of each Embodiment, the UE and the BS (and/or uplink/downlink, transmission/reception and the like) may be read with each other.

Further, each Embodiment as described above illustrates the example of recovery from beam failure by shadowing, and the present invention is also applicable to beam failure by other factors (fading, interference and the like). For example, in a transmission/reception pair under use, in the case where electric wave failure occurs in a certain bandwidth, the UE may changes to a beam (e.g. beam of a wider band, beam of another band) including frequency resources different from frequency resources of the bandwidth to perform beam recovery.

Further, in the case where communication deteriorates (or communication is impossible) by inter-cell and/or inter-user interference, the UE may change the transmission beam and notify of the transmission beam update information, and the BS may change the reception beam so as to avoid interference using the information as a trigger to perform beam recovery.

(Radio Communication System)

A configuration of a radio communication system according to one Embodiment of the present invention will be described below. In the radio communication system, communication is performed by using any of the radio communication method according to each Embodiment or combination thereof.

Figure 6:
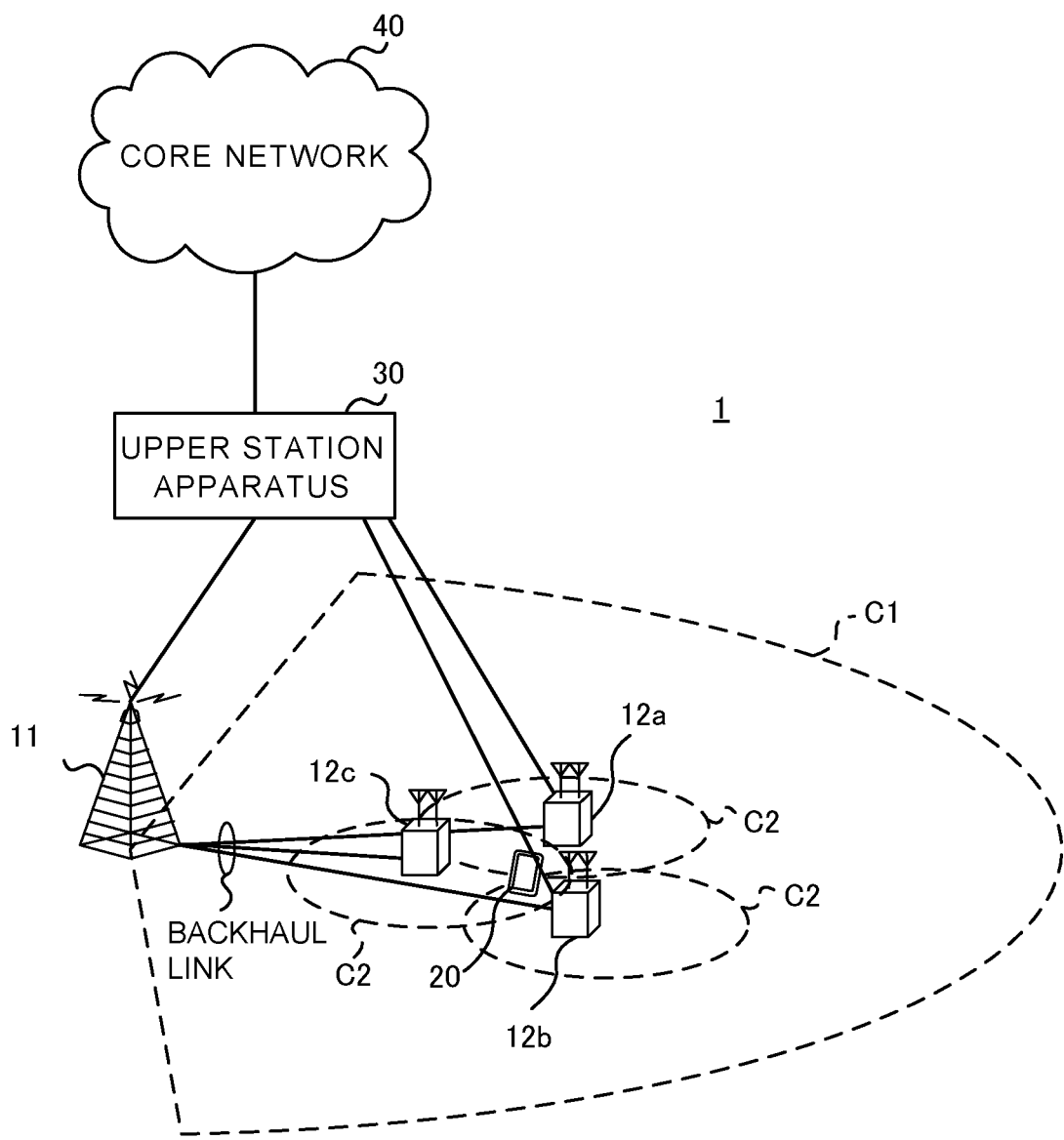
FIG. 6 is a diagram showing one example of a schematic configuration of a radio communication system according to one Embodiment of the present invention.

FIG. 6 is a diagram showing one example of a schematic configuration of the radio communication system according to one Embodiment of the present invention. In the radio communication system 1, it is possible to apply carrier aggregation (CA) to aggregate a plurality of base frequency blocks (component carriers) with a system bandwidth (e.g. 20 MHz) of the LTE system as one unit and/or dual connectivity (DC).

In addition, the radio communication system 1 may be called LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology) and the like, or may be called the system to actualize each system described above.

The radio communication system 1 is provided with a radio base station 11 for forming a macrocell C1 with relatively wide coverage, and radio base stations 12 (12a to 12c) disposed inside the macrocell C1 to form small cells C2 narrower than the macrocell C1. Further, a user terminal 20 is disposed in the macrocell C1 and each of the small cells C2. The arrangement and numbers of cells and user terminal 20 are not limited to those shown in the figure.

The user terminal 20 is capable of connecting to both the radio base station 11 and the radio base station 12. The user terminal 20 is assumed to concurrently use the macrocell C1 and small cell C2 using CA or DC. Further, the user terminal 20 may apply CA or DC using a plurality of cells (CCs) (e.g. 5 CCs or less, 6 CCs or more).

The user terminal 20 and radio base station 11 are capable of communicating with each other using carriers (called the existing carrier, legacy carrier and the like) with a narrow bandwidth in a relatively low frequency band (e.g. 2 GHz). On the other hand, the user terminal 20 and radio base station 12 may use carriers with a wide bandwidth in a relatively high frequency band (e.g. 3.5 GHz, 5 GHz and the like), or may use the same carrier as in the radio base station 11. In addition, the configuration of the frequency band used in each radio base station is not limited thereto.

It is possible to configure so that the radio base station 11 and radio base station 12 (or two radio base stations 12) undergo wired connection (e.g. optical fiber in conformity with CPRI (Common Public Radio Interface), X2 interface and the like), or wireless connection.

The radio base station 11 and each of the radio base stations 12 are respectively connected to an upper station apparatus 30, and are connected to a core network 40 via the upper station apparatus 30. In addition, for example, the upper station apparatus 30 includes an access gateway apparatus, Radio Network Controller (RNC), Mobility Management Entity (MME) and the like, but is not limited thereto. Further, each of the radio base stations 12 may be connected to the upper station apparatus 30 via the radio base station 11.

In addition, the radio base station 11 is a radio base station having relatively wide coverage, and may be called a macro base station, collection node, eNB (eNodeB), transmission/reception point and the like. Further, the radio base station 12 is a radio base station having local coverage, and may be called a small base station, micro-base station, pico-base station, femto-base station, HeNB (Home eNodeB), RRH (Remote Radio Head), transmission/reception point and the like. Hereinafter, in the case of not distinguishing between the radio base stations 11 and 12, the stations are collectively called a radio base station 10.

Each user terminal 20 is a terminal supporting various communication schemes such as LTE and LTE-A, and may include a fixed communication terminal (fixed station), as well as the mobile communication terminal (mobile station).

In the radio communication system 1, as radio access schemes, Orthogonal Frequency Division Multiple Access (OFDMA) is applied on downlink, and Single Carrier-Frequency Division Multiple Access (SC-FDMA) is applied on uplink.

OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing a system bandwidth into bands comprised of a single or contiguous resource blocks for each terminal so that a plurality of terminals uses mutually different bands, and thereby reducing interference among terminals. In addition, uplink and downlink radio access schemes are not limited to the combination of the schemes, and another radio access scheme may be used.

As downlink channels, in the radio communication system 1 are used a downlink shared channel (PDSCH: Physical Downlink Shared Channel) shared by user terminals 20, broadcast channel (PBCH: Physical Broadcast Channel), downlink L1/L2 control channels and the like. User data, higher layer control information, SIB (System Information Block) and the like are transmitted on the PDSCH. Further, MIB (Master Information Block) is transmitted on the PBCH.

The downlink L1/L2 control channel includes PDCCH (Physical Downlink Control Channel), EPDCCH (Enhanced Physical Downlink Control channel), PCFICH (Physical Control Format Indicator Channel), PHICH (Physical Hybrid-ARQ Indicator Channel) and the like. The downlink control information (DCI) including scheduling information of the PDSCH and PUSCH and the like is transmitted on the PDCCH. The number of OFDM symbols used in the PDCCH is transmitted on the PCFICH. Receipt confirmation information (e.g. also called retransmission control information, HARQ-ACK, ACK/NACK, and the like) of HARQ (Hybrid Automatic Repeat reQuest) for the PUSCH is transmitted on the PHICH. The EPDCCH is frequency division multiplexed with the PDSCH (downlink shared data channel) to be used in transmitting the DCI and the like as the PDCCH.

As uplink channels, in the radio communication system 1 are used an uplink shared channel (PUSCH: Physical Uplink Shared Channel) shared by user terminals 20, uplink control channel (PUCCH: Physical Uplink Control Channel), random access channel (PRACH: Physical Random Access Channel) and the like. User data, higher layer control information and the like are transmitted on the PUSCH. Further, radio quality information (CQI: Channel Quality Indicator) of downlink, receipt confirmation information and the like are transmitted on the PUCCH. A random access preamble to establish connection with the cell is transmitted on the PRACH.

As downlink reference signals, in the radio communication system 1 are transmitted Cell-specific Reference Signal (CRS), Channel State Information-Reference Signal (CSI-RS), demodulation reference signal (DMRS: DeModulation Reference Signal), Positioning Reference Signal (PRS) and the like. Further, as uplink reference signals, in the radio communication system 1 are transmitted Sounding Reference Signal (SRS), demodulation reference signal (DMRS) and the like. In addition, the DMRS may be called UE-specific Reference Signal. Further, the transmitted reference signals are not limited thereto.

(Radio Base Station)

Figure 7:
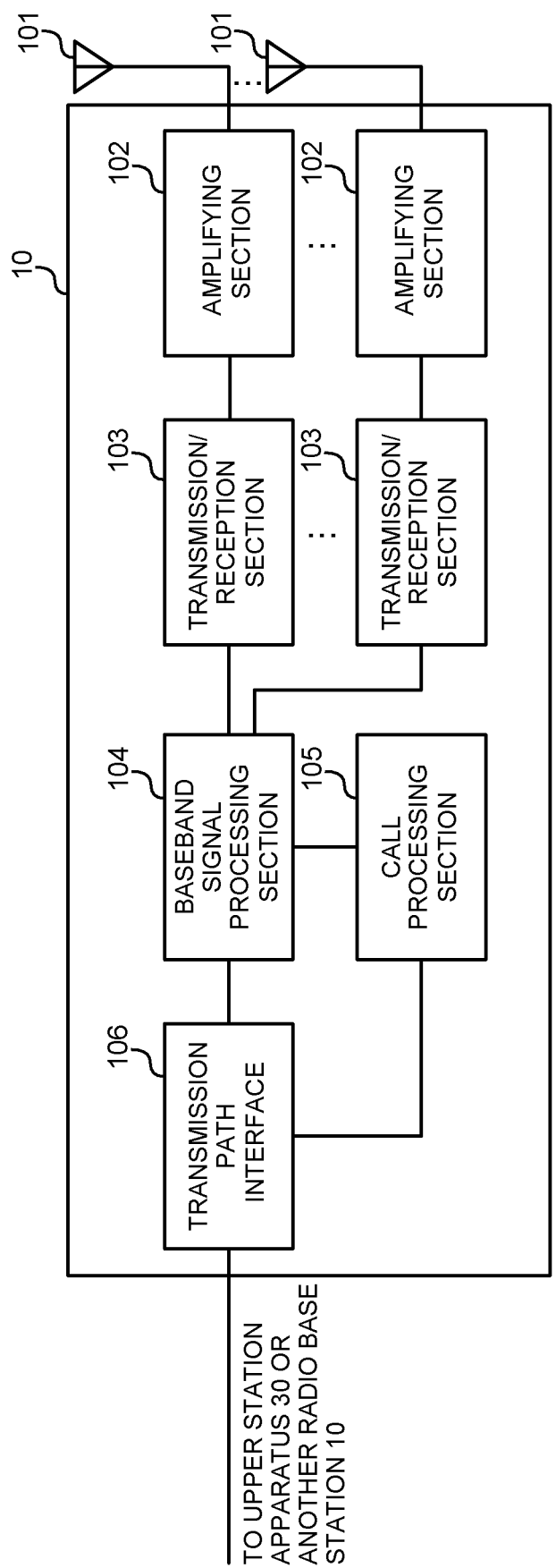
FIG. 7 is a diagram showing one example of an entire configuration of a radio base station according to one Embodiment of the invention.

FIG. 7 is a diagram showing one example of an entire configuration of the radio base station according to one Embodiment of the present invention. The radio base station 10 is provided with a plurality of transmission/reception antennas 101, amplifying sections 102, transmission/reception sections 103, baseband signal processing section 104, call processing section 105, and transmission path interface 106. In addition, with respect to each of the transmission/reception antenna 101, amplifying section 102, and transmission/reception section 103, the radio base station may be configured to include at least one or more.

User data to transmit to the user terminal 20 from the radio base station 10 on downlink is input to the baseband signal processing section 104 from the upper station apparatus 30 via the transmission path interface 106.

The baseband signal processing section 104 performs, on the user data, transmission processing such as processing of PDCP (Packet Data Convergence Protocol) layer, segmentation and concatenation of the user data, transmission processing of RLC (Radio Link Control) layer such as RLC retransmission control, MAC (Medium Access Control) retransmission control (e.g. transmission processing of HARQ), scheduling, transmission format selection, channel coding, Inverse Fast Fourier Transform (IFFT) processing, and precoding processing to transfer to the transmission/reception sections 103. Further, also concerning a downlink control signal, the section 104 performs transmission processing such as channel coding and Inverse Fast Fourier Transform on the signal to transfer to the transmission/reception sections 103.

Each of the transmission/reception sections 103 converts the baseband signal, which is subjected to precoding for each antenna and is output from the baseband signal processing section 104, into a signal with a radio frequency band to transmit. The radio-frequency signal subjected to frequency conversion in the transmission/reception section 103 is amplified in the amplifying section 102, and is transmitted from the transmission/reception antenna 101. The transmission/reception section 103 is capable of being comprised of a transmitter/receiver, transmission/reception circuit or transmission/reception apparatus explained based on common recognition in the technical field according to the present invention. In addition, the transmission/reception section 103 may be comprised as an integrated transmission/reception section, or may be comprised of a transmission section and reception section.

On the other hand, for uplink signals, radio-frequency signals received in the transmission/reception antennas 101 are amplified in the amplifying sections 102. The transmission/reception section 103 receives the uplink signal amplified in the amplifying section 102. The transmission/reception section 103 performs frequency conversion on the received signal into a baseband signal to output to the baseband signal processing section 104.

For user data included in the input uplink signal, the baseband signal processing section 104 performs Fast Fourier Transform (FFT) processing, Inverse Discrete Fourier Transform (IDFT) processing, error correcting decoding, reception processing of MAC retransmission control, and reception processing of RLC layer and PDCP layer to transfer to the upper station apparatus 30 via the transmission path interface 106. The call processing section 105 performs call processing (setting, release and the like) of a communication channel, state management of the radio base station 10, and management of radio resources.

The transmission path interface 106 transmits and receives signals to/from the upper station apparatus 30 via a predetermined interface. Further, the transmission path interface 106 may transmit and receive signals (backhaul signaling) to/from another radio base station 10 via an inter-base station interface (e.g. optical fiber in conformity with CPRI (Common Public Radio Interface), X2 interface).

In addition, the transmission/reception section 103 may further have an analog beam forming section that performs analog beam forming. The analog beam forming section is capable of being comprised of a beam forming circuit (e.g. phase shifter, phase shift circuit) or beam forming apparatus (e.g. phase shift device) explained based on the common recognition in the technical field according to the present invention. Further, for example, the transmission/reception antenna 101 may be comprised of an array antenna.

The transmission/reception section 103 may transmit a signal using a transmission beam, or may transmit a signal using a reception beam.

The transmission/reception section 103 may receive the transmission beam update information in resources scheduled for the uplink shared channel (e.g. PUSCH) by UL grant.

The transmission/reception section 103 may transmit information about a combination of a transmission/reception pair, information on resources to transmit (or not to transmit) the transmission beam update information, information indicative of availability of transmission beam update information notification, information on resources for UL grant-free PUSCH for enabling transmission of the transmission beam update information and the like.

Figure 8:
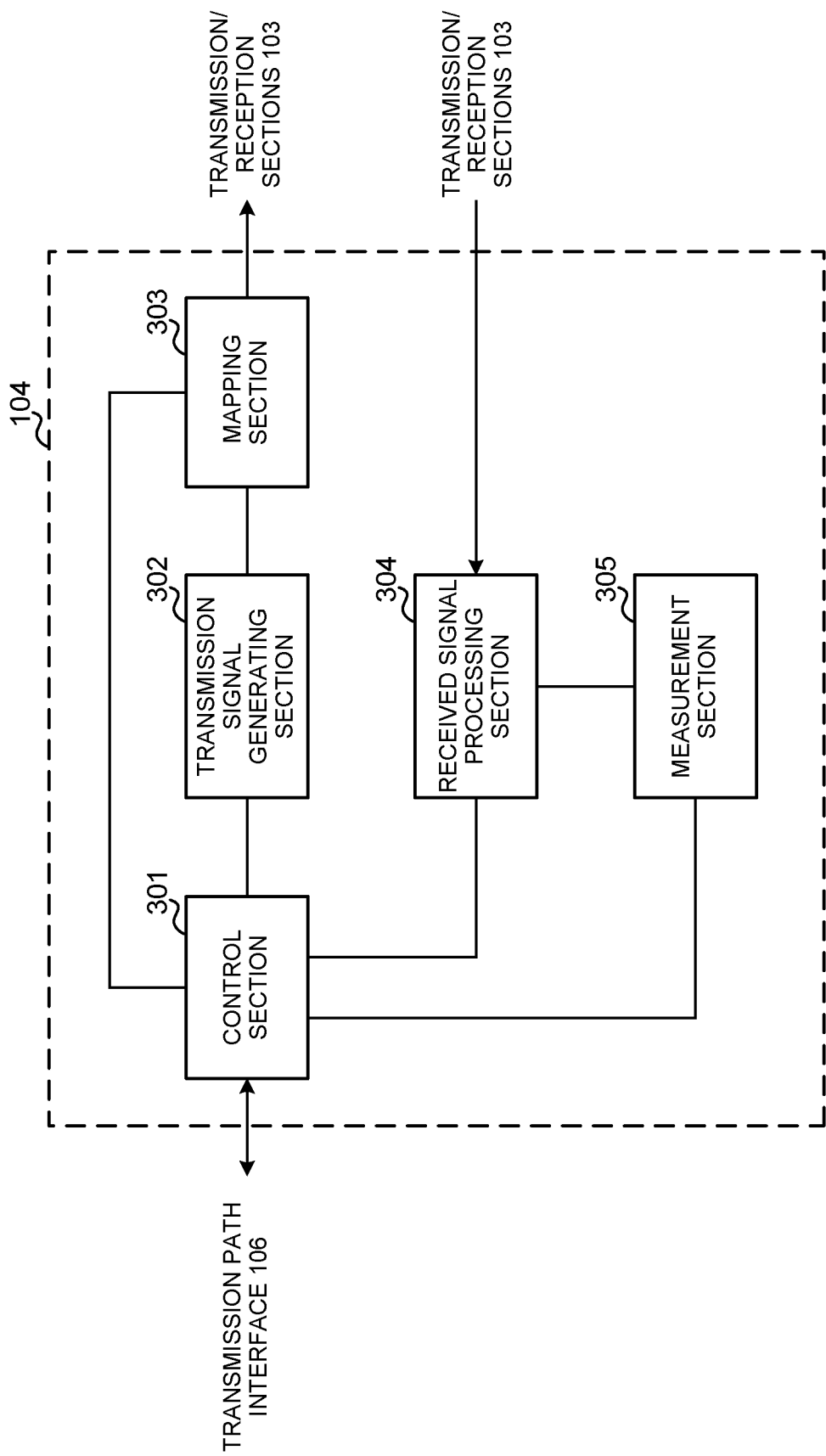
FIG. 8 is a diagram showing one example of a function configuration of the radio base station according to one Embodiment of the invention.

FIG. 8 is a diagram showing one example of a function configuration of the radio base station according to one Embodiment of the present invention. In addition, this example mainly illustrates function blocks of a characteristic portion in this Embodiment, and the radio base station 10 is assumed to have other function blocks required for radio communication.

The baseband signal processing section 104 is provided with at least a control section (scheduler) 301, transmission signal generating section 302, mapping section 303, received signal processing section 304, and measurement section 305. In addition, these components are essentially included in the radio base station 10, and a part or the whole of the components may not be included in the baseband signal processing section 104.

The control section (scheduler) 301 performs control of the entire radio base station 10. The control section 301 is capable of being comprised of a controller, control circuit or control apparatus explained based on the common recognition in the technical field according to the present invention.

For example, the control section 301 controls generation of signals by the transmission signal generating section 302, allocation of signals by the mapping section 303 and the like. Further, the control section 301 controls reception processing by the received signal processing section 304, measurement of signals by the measurement section 305 and the like.

The control section 310 controls scheduling (e.g. resource allocation) of the system information, downlink data signals (e.g. signals transmitted on the PDSCH), and downlink control signals (e.g. signals transmitted on the PDCCH and/or EPDCCH, receipt conformation signal and the like). Further, based on a result obtained by judging necessity of retransmission control on the uplink data signal and the like, the control section 301 controls generation of the downlink control signal, downlink data signal and the like. Furthermore, the control section 310 controls scheduling of synchronization signals (e.g. PSS (Primary Synchronization Signal)/SSS (Secondary Synchronization Signal)), downlink reference signals (e.g. CRS, CSI-RS, DMRS) and the like.

Further, the control section 301 controls scheduling of uplink data signals (e.g. signals transmitted on the PUSCH), uplink control signals (e.g. signals transmitted on the PUCCH and/or PUSCH, receipt conformation information and the like), random access preamble (e.g. signal transmitted on the PRACH), uplink reference signals and the like.

The control section 301 controls to form the transmission beam and/or the reception bema, using digital BF (e.g. precoding) by the baseband signal processing section 104 and/or analog BF (e.g. phase rotation) by the transmission/reception section 103. The control section 301 may control to form the beam, based on the downlink propagation path information, uplink propagation path information and the like. These pieces of propagation path information may be acquired from the received signal processing section 304 and/or the measurement section 305.

Upon acquiring the transmission beam update information transmitted from the user terminal 20 from the received signal processing section 304, the control section 301 may perform control to update the reception beam. For example, being triggered by reception of the beam update information, the control section 301 may perform beam sweeping to identify the changed transmission beam of the user terminal 20 and/or a reception beam of the radio base statin 10 suitable for the changed transmission beam.

In the case where the BS does not receive a signal from the user terminal 20 for a predetermined time (period), the control section 301 may perform sweeping on reception beams to search and update the reception beam. Further, in the case where the BS is incapable of receiving a signal from the user terminal 20 even by sweeping reception beams, the control section 301 may transmit a signal (e.g. PDCCH order) to cause the user terminal 20 to perform the random access procedure.

Based on instructions from the control section 301, the transmission signal generating section 302 generates downlink signals (downlink control signal, downlink data signal, downlink reference signal and the like) to output to the mapping section 303. The transmission signal generating section 302 is capable of being comprised of a signal generator, signal generating circuit or signal generating apparatus explained based on the common recognition in the technical field according to the present invention.

For example, based on instructions from the control section 301, the transmission signal generating section 302 generates DL assignment to notify of assignment information of downlink signals and UL grant to notify of assignment information of uplink signals. Further, the downlink data signal is subjected to coding processing and modulation processing, according to a coding rate, modulation scheme and the like determined based on the channel state information (CSI) from each user terminal 20.

Based on instructions from the control section 301, the mapping section 303 maps the downlink signal generated in the transmission signal generating section 302 to predetermined radio resources to output to the transmission/reception section 103. The mapping section 303 is capable of being comprised of a mapper, mapping circuit or mapping apparatus explained based on the common recognition in the technical field according to the present invention.

The received signal processing section 304 performs reception processing (e.g. demapping, demodulation, decoding and the like) on the received signal input from the transmission/reception section 103. Herein, for example, the received signal is the uplink signal (uplink control signal, uplink data signal, uplink reference signal and the like) transmitted from the user terminal 20. The received signal processing section 304 is capable of being comprised of a signal processor, signal processing circuit or signal processing apparatus explained based on the common recognition in the technical field according to the present invention.

The received signal processing section 304 outputs the information decoded by the reception processing to the control section 301. For example, in the case of receiving the PUCCH including HARQ-ACK, the section 304 outputs the HARQ-ACK to the control section 301. Further, the received signal processing section 304 outputs the received signal and/or signal subjected to the reception processing to the measurement section 305.

The measurement section 305 performs measurement on the received signal. The measurement section 305 is capable of being comprised of a measurement device, measurement circuit or measurement apparatus explained based on the common recognition in the technical field according to the present invention.

For example, based on the received signal, the measurement section 305 may perform RRM (Radio Resource Management) measurement, CSI (Channel State Information) measurement and the like. The measurement section 305 may measure received power (e.g. RSRP (Reference Signal Received Power)), received quality (e.g. RSRQ (Reference Signal Received Quality)), SINR (Signal to Interference plus Noise Ratio)), signal strength (e.g. RSSI (Received Signal Strength Indicator)), propagation path information (e.g. CSI) and the like. The measurement result may be output to the control section 301.

(User Terminal)

Figure 9:
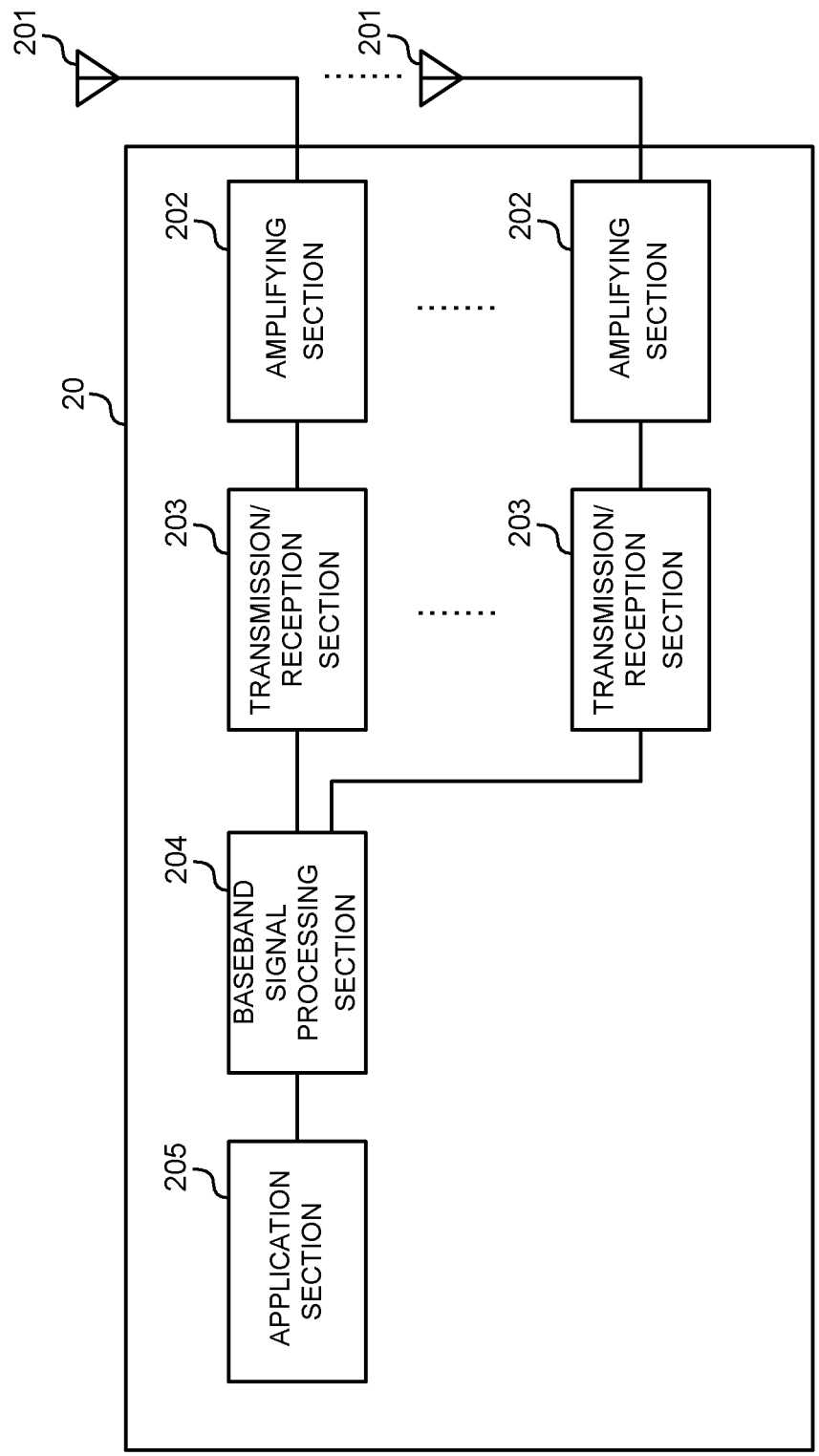
FIG. 9 is a diagram showing one example of an entire configuration of a user terminal according to one Embodiment of the invention.

FIG. 9 is a diagram showing one example of an entire configuration of the user terminal according to one Embodiment of the present invention. The user terminal is provided with a plurality of transmission/reception antennas 201, amplifying sections 202, transmission/reception sections 203, baseband signal processing section 204, and application section 205. In addition, with respect to each of the transmission/reception antenna 201, amplifying section 202, and transmission/reception section 203, the user terminal may be configured to include at least one or more.

Radio-frequency signals received in the transmission/reception antennas 201 are respectively amplified in the amplifying sections 202. Each of the transmission/reception sections 203 receives the downlink signal amplified in the amplifying section 202.

The transmission/reception section 203 performs frequency conversion on the received signal into a baseband signal to output to the baseband signal processing section 204. The transmission/reception section 203 is capable of being comprised of a transmitter/receiver, transmission/reception circuit or transmission/reception apparatus explained based on the common recognition in the technical field according to the present invention. In addition, the transmission/reception section 203 may be comprised as an integrated transmission/reception section, or may be comprised of a transmission section and reception section.

The baseband signal processing section 204 performs FFT processing, error correcting decoding, reception processing of retransmission control and the like on the input baseband signal. User data on downlink is transferred to the application section 205. The application section 205 performs processing concerning layers higher than the physical layer and MAC layer, and the like. Further, among the downlink data, broadcast information may also be transferred to the application section 205.

On the other hand, for user data on uplink, the data is input to the baseband signal processing section 204 from the application section 205. The baseband signal processing section 204 performs transmission processing of retransmission control (e.g. transmission processing of HARQ), channel coding, precoding, Discrete Fourier Transform (DFT) processing, IFFT processing and the like to transfer to each of the transmission/reception sections 203. Each of the transmission/reception sections 203 converts the baseband signal output from the baseband signal processing section 204 into a signal with a radio frequency band to transmit. The radio-frequency signals subjected to frequency conversion in the transmission/reception sections 203 are amplified in the amplifying sections 202, and transmitted from the transmission/reception antennas 201, respectively.

In addition, the transmission/reception section 203 may further have an analog beam forming section for performing analog beam forming. The analog beam forming section may be comprised of an analog beam forming circuit (e.g. phase shifter, phase shift circuit) or analog beam forming apparatus (e.g. phase shift device) explained based on the common recognition in the technical field according to the present invention. Further, for example, the transmission/reception antenna 201 may be comprised of an array antenna.

The transmission/reception section 203 may transmit a signal using a transmission beam, and receive a signal using a reception beam. In the case where the control section 401 updates the transmission beam, the transmission/reception section 203 may transmit information about transmission beam update using the updated transmission beam, and may transmit the information using a carrier different from the carrier used in the transmission beam.

The transmission/reception section 203 may transmit the transmission beam update information using the uplink shared channel (e.g. PUSCH) in resources judged as enabling notification of the transmission beam update information by the control section 401.

The transmission/reception section 203 may receive the information about a combination of a transmission/reception pair, the information on resources to transmit (or not to transmit) the transmission beam update information, the information indicative of availability of transmission beam update information notification, the information on resources for UL grant-free PUSCH for enabling transmission of the transmission beam update information and the like.

Figure 10:
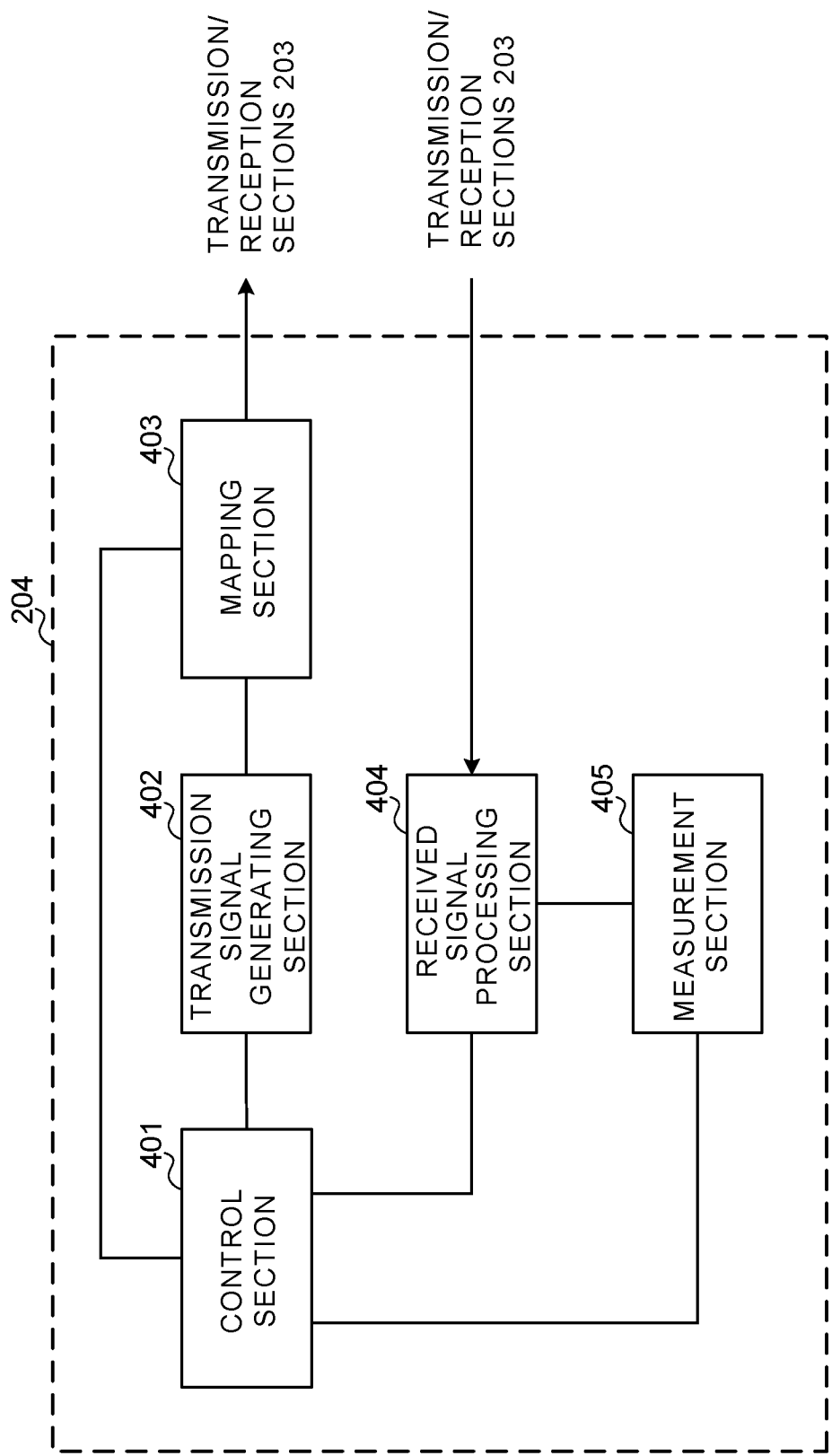
FIG. 10 is a diagram showing one example of a function configuration of the user terminal according to one Embodiment of the invention.

FIG. 10 is a diagram showing one example of a function configuration of the user terminal according to one Embodiment of the present invention. In addition, this example mainly illustrates function blocks of a characteristic portion in this Embodiment, and the user terminal 20 is assumed to have other function blocks required for radio communication.

The baseband signal processing section 204 that the user terminal 20 has is provided with at least a control section 401, transmission signal generating section 402, mapping section 403, received signal processing section 404, and measurement section 405. In addition, these components are essentially included in the user terminal 20, and a part or the whole of the components may not be included in the baseband signal processing section 204.

The control section 401 performs control of the entire user terminal 20. The control section 401 is capable of being comprised of a controller, control circuit or control apparatus explained based on the common recognition in the technical field according to the present invention.

For example, the control section 401 controls generation of signals by the transmission signal generating section 402, allocation of signals by the mapping section 403 and the like. Further, the control section 401 controls reception processing of signals by the received signal processing section 404, measurement of signals by the measurement section 405 and the like.

The control section 401 acquires the downlink control signal and downlink data signal transmitted from the radio base station 10 from the received signal processing section 404. Based on a result obtained by judging necessity of retransmission control on the downlink control signal and/or the downlink data signal and the like, the control section 401 controls generation of the uplink control signal and/or the uplink data signal.

The control section 401 may control to form the transmission beam and/or the reception bema, using digital BF (e.g. precoding) by the baseband signal processing section 204 and/or analog BF (e.g. phase rotation) by the transmission/reception section 203. The control section 401 may control to form the beam, based on the downlink propagation path information, uplink propagation path information and the like. These pieces of propagation path information may be acquired from the received signal processing section 404 and/or the measurement section 405.

In the case of updating the transmission beam (e.g. in the case of autonomously updating the transmission beam without being triggered by notification from the radio base station 10), the control section 401 may perform control to transmit the transmission beam update information using the updated transmission beam. The transmission beam update information may include an index about the updated beam, and may include information (that may be called beam update notification, beam change notification and the like) indicating that the beam is changed.

The control section 401 may perform control to transmit the transmission beam update information, using higher layer signaling (e.g. RRC signaling, MAC signaling), physical layer signaling (e.g. UCI) or combination thereof.

Based on at least one of higher layer signaling, physical layer signaling, and user terminal capability information, among resources of the uplink shared channel (e.g. PUSCH) indicated by the downlink control information (DCI for scheduling uplink data, UL grant), the control section 401 may determine resources for enabling notification of information about the transmission beam update.

The control section 401 may determine the resources for enabling notification of information about the transmission beam update among the resources of the uplink shared channel, without using the downlink control information (without UL grant).

Further, in the case of acquiring various types of information notified from the radio base station 10 from the received signal processing section 404, the control section 401 may update a parameter used in control based on the information.

Based on instructions from the control section 401, the transmission signal generating section 402 generates uplink signals (including the uplink data channel, uplink control channel, uplink reference signal and the like) to output to the mapping section 403. The transmission signal generating section 402 is capable of being comprised of a signal generator, signal generating circuit or signal generating apparatus explained based on the common recognition in the technical field according to the present invention.

For example, based on instructions from the control section 401, the transmission signal generating section 402 generates the uplink control signal about receipt confirmation information, channel state information (CSI) and the like. Further, based on instructions from the control section 401, the transmission signal generating section 402 generates the uplink data signal. For example, when the downlink control signal notified from the radio base station 10 includes the UL grant, the transmission signal generating section 402 is instructed to generate the uplink data signal from the control section 401.

Based on instructions from the control section 401, the mapping section 403 maps the uplink signal generated in the transmission signal generating section 402 to radio resources to output to the transmission/reception section 203. The mapping section 403 is capable of being comprised of a mapper, mapping circuit or mapping apparatus explained based on the common recognition in the technical field according to the present invention.

The received signal processing section 404 performs reception processing (e.g. demapping, demodulation, decoding and the like) on the received signal input from the transmission/reception section 203. Herein, for example, the received signal is the downlink signal (downlink control signal, downlink data signal, downlink reference signal and the like) transmitted from the radio base station 10. The received signal processing section 404 is capable of being comprised of a signal processor, signal processing circuit or signal processing apparatus explained based on the common recognition in the technical field according to the present invention.

The received signal processing section 404 outputs the information decoded by the reception processing to the control section 401. For example, the received signal generating section 404 outputs the broadcast information, system information, RRC signaling, DCI and the like to the control section 401. Further, the received signal processing section 404 outputs the received signal and/or signal subjected to the reception processing to the measurement section 405.

The measurement section 405 performs measurement on the received signal. The measurement section 405 is capable of being comprised of a measurement device, measurement circuit or measurement apparatus explained based on the common recognition in the technical field according to the present invention.

For example, based on the received signal, the measurement section 405 may perform RRM measurement, CSI measurement and the like. The measurement section 405 may measure received power (e.g. RSRP (Reference Signal Received Power)), received quality (e.g. RSRQ, SINR), signal strength (e.g. RSSI), propagation path information (e.g. CSI) and the like. The measurement result may be output to the control section 401.

(Hardware Configuration)

In addition, the block diagrams used in explanation of the above-mentioned Embodiment show blocks on a function-by-function basis. These function blocks (configuration sections) are actualized by any combination of hardware and/or software. Further, the means for actualizing each function block is not limited particularly. In other words, each function block may be actualized by a single apparatus combined physically and/or logically, or two or more apparatuses that are separated physically and/or logically are connected directly and/or indirectly (e.g. by cable and/or radio), and each function block may be actualized by a plurality of these apparatuses.

Figure 11:
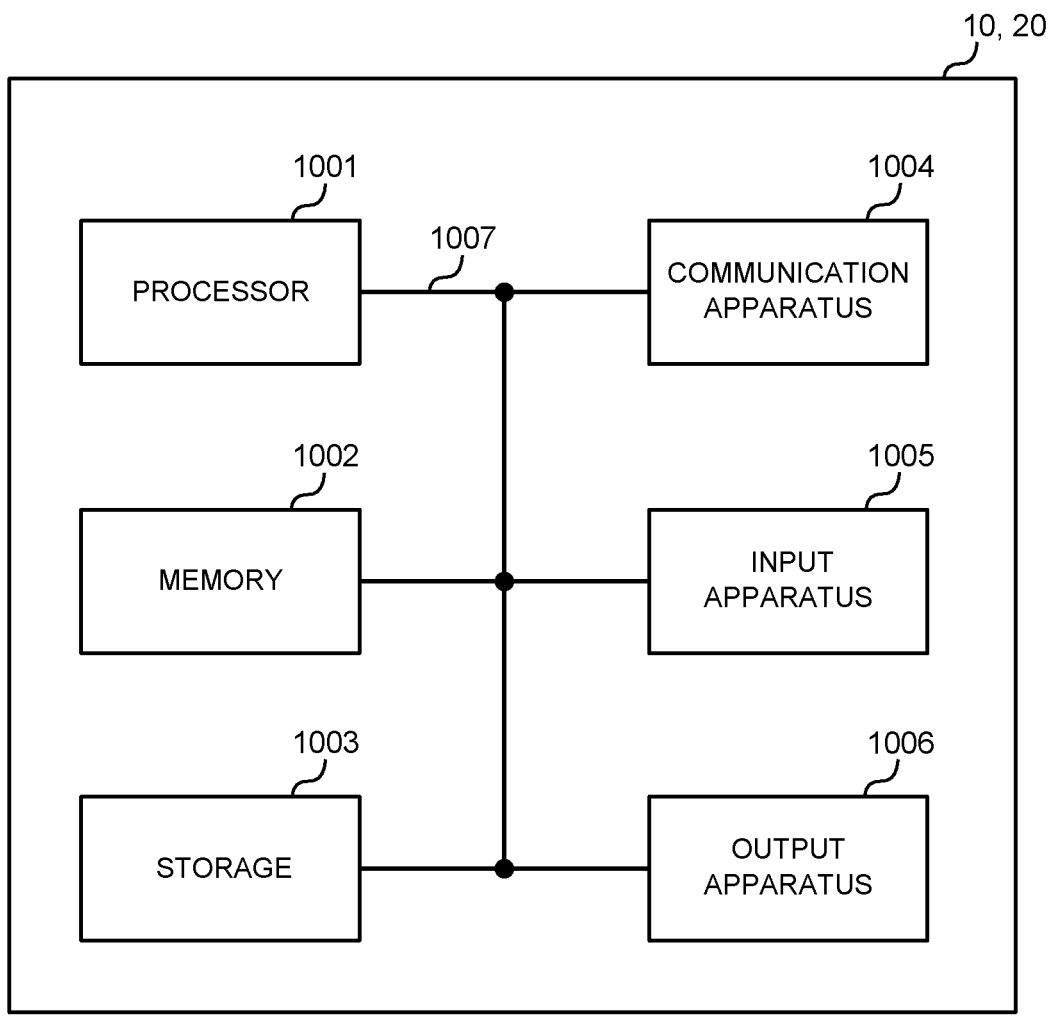
FIG. 11 is a diagram showing one example of hardware configurations of the radio base station and user terminal according to one Embodiment of the invention.

For example, each of the radio base station, user terminal and the like in one Embodiment of the present invention may function as a computer that performs the processing of the radio communication method of the invention. FIG. 11 is a diagram showing one example of a hardware configuration of each of the radio base station and user terminal according to one Embodiment of the invention. Each of the radio base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the following description, it is possible to replace the letter of "apparatus" with a circuit, device, unit and the like to read. With respect to each apparatus shown in the figure, the hardware configuration of each of the radio base station 10 and the user terminal 20 may be configured so as to include a single or a plurality, or may be configured without including a part of apparatuses.

For example, a single processor 1001 is shown in the figure, but a plurality of processors may exist. Further, the processing may be executed by a single processor, or may be executed by one or more processors at the same time, sequentially or by another technique. In addition, the processor 1001 may be implemented on one or more chips.

For example, each function in the radio base station 10 and user terminal 20 is actualized in a manner such that predetermined software (program) is read on the hardware of the processor 1001, memory 1002 and the like, and that the processor 1001 thereby performs computations, and controls communication by the communication apparatus 1004, and read and/or write of data in the memory 1002 and storage 1003.

For example, the processor 1001 operates an operating system to control the entire computer. The processor 1001 may be comprised of a Central Processing Unit (CPU) including interfaces with peripheral apparatuses, control apparatus, computation apparatus, register and the like. For example, the above-mentioned baseband signal processing section 104 (204), call processing apparatus 105 and the like may be actualized by the processor 1001.

Further, the processor 1001 reads the program (program code), software module, data and the like on the memory 1002 from the storage 1003 and/or the communication apparatus 1004, and according thereto, executes various kinds of processing. Used as the program is a program that causes the computer to execute at least a part of operation described in the above-mentioned Embodiment. For example, the control section 401 of the user terminal 20 may be actualized by a control program stored in the memory 1002 to operate in the processor 1001, and the other function blocks may be actualized similarly.

The memory 1002 is a computer-readable storage medium, and for example, may be comprised of at least one of ROM (Read Only Memory), EPROM (Erasable Programmable ROM), EEPROM (Electrically EPROM), RAM (Random Access Memory) and other proper storage media. The memory 1002 may be called the register, cache, main memory (main storage apparatus) and the like. The memory 1002 is capable of storing the program (program code), software module and the like executable to implement the radio communication method according to one Embodiment of the present invention.

The storage 1003 is a computer-readable storage medium, and for example, may be comprised of at least one of a flexible disk, floppy (Registered Trademark) disk, magneto-optical disk (e.g. compact disk (CD-ROM (Compact Disc ROM), etc.), digital multi-purpose disk, Blu-ray (Registered Trademark) disk), removable disk, hard disk drive, smart card, flash memory device (e.g. card, stick, key drive), magnetic stripe, database, server and other proper storage media. The storage 1003 may be called an auxiliary storage apparatus.

The communication apparatus 1004 is hardware (transmission/reception device) to perform communication between computers via a wired and/or wireless network, and for example, is also referred to as a network device, network controller, network card, communication module and the like. For example, in order to actualize Frequency Division Duplex (FDD) and/or Time Division Duplex (TDD), the communication apparatus 1004 may be comprised by including a high-frequency switch, duplexer, filter, frequency synthesizer and the like.

For example, the transmission/reception antenna 101 (201), amplifying section 102 (202), transmission/reception section 103 (203), transmission path interface 106 and the like as described above may be actualized by the communication apparatus 1004.

The input apparatus 1005 is an input device (e.g. keyboard, mouse, microphone, switch, button, sensor and the like) that receives input from the outside. The output apparatus 1006 is an output device (e.g. display, speaker, LED (Light Emitting Diode) lamp and the like) that performs output to the outside. In addition, the input apparatus 1005 and output apparatus 1006 may be an integrated configuration (e.g. touch panel).

Further, each apparatus of the processor 1001, memory 1002 and the like is connected on the bus 1007 to communicate information. The bus 1007 may be comprised of a single bus, or may be comprised of different buses between apparatuses.

Furthermore, each of the radio base station 10 and user terminal 20 may be configured by including hardware such as a microprocessor, Digital Signal Processor (DSP), ASIC (Application Specific Integrated Circuit), PLD (Programmable Logic Device), and FPGA (Field Programmable Gate Array), or a part or the whole of each function block may be actualized by the hardware. For example, the processor 1001 may be implemented by at least one of the hardware.

(Modification)

In addition, the term explained in the present Description and/or the term required to understand the present Description may be replaced with a term having the same or similar meaning. For example, the channel and/or the symbol may be a signal (signaling). Further, the signal may be a message. The reference signal is capable of being abbreviated as RS (Reference Signal), and according to the standard to apply, may be called a pilot, pilot signal and the like. Furthermore, a component carrier (CC) may be called a cell, frequency carrier, carrier frequency and the like.

Further, the radio frame may be comprised of a single or a plurality of frames in the time domain. The single or each of the plurality of frames constituting the radio frame may be called a subframe. Furthermore, the subframe may be comprised of a single or a plurality of slots in the time domain. The subframe may be a fix time length (e.g. 1 ms) that is not dependent on numerology.

Still furthermore, the slot may be comprised of a single or a plurality of symbols (OFDM (Orthogonal Frequency Division Multiplexing) symbol, SC-FDMA (Single Carrier Frequency Division Multiple Access) symbol and the like) in the time domain. Further, the slot may include a plurality of mini-slots. Each mini-slot may be comprised of a single or a plurality of symbols in the time domain. Furthermore, the mini-slot may be called a sub-slot.

Each of the radio frame, subframe, slot, mini-slot and symbol represents a time unit in transmitting a signal. For the radio frame, subframe, slot, mini-slot and symbol, another name corresponding to each of them may be used. For example, one subframe may be called Transmission Time Interval (TTI), a plurality of contiguous subframes may be called TTI, or one slot or one mini-slot may be called TTI. In other words, the subframe and/or TTI may be the subframe (1 ms) in the existing LTE, may be a frame (e.g. 1 to 13 symbols) shorter than 1 ms, or may be a frame longer than 1 ms. In addition, the unit representing the TTI may be called the slot, mini-slot and the like, instead of the subframe.

Herein, for example, the TTI refers to a minimum time unit of scheduling in radio communication. For example, in the LTE system, the radio base station performs scheduling for allocating radio resources (frequency bandwidth, transmit power and the like capable of being used in each user terminal) to each user terminal in a TTI unit. In addition, the definition of the TTI is not limited thereto.

The TTI may be a transmission time unit of a data packet (transport block) subjected to channel coding, code block and/or codeword, or may be a processing unit of scheduling, link adaptation and the like. In addition, when the TTI is given, a time interval (e.g. the number of symbols), to which the transport block, code block and/or codeword is actually mapped, may be shorter than the TTI.

In addition, in the case where one slot or one mini-slot is called the TTI, one or more TTIs (i.e. one or more slots or one or more mini-slots) may be a minimum time unit of scheduling. Further, the number of slots (the number of mini-slots) constituting the minimum time unit of scheduling may be controlled.

The TTI having a time length of 1 ms may be called ordinary TTI (TTI in LTE Rel.8-12), normal TTI, long TTI, ordinary subframe, normal subframe, long subframe or the like. TTI shorter than the ordinary TTI may be called reduced TTI, short TTI, partial or fractional TTI, reduced subframe, short subframe, mini-slot, sub-slot or the like.

In addition, the long TTI (e.g. ordinary TTI, subframe and the like) may be read with TTI having a time length exceeding 1 ms, or the short TTI (e.g. reduced TTI) may be read with TTI having a TTI length of 1 ms or more and less than the TTI length of the long TTT.

The resource block (RB) is are source allocation unit in the time domain and frequency domain, and may include a single or a plurality of contiguous subcarriers in the frequency domain. Further, the RB may include a single or a plurality of symbols in the time domain, and may have a length of 1 slot, 1 min-slot, 1 subcarrier, or 1 TTI. Each of 1 TTI and 1 subframe may be comprised of a single or a plurality of resource blocks. In addition, a single or a plurality of RBs may be called a physical resource block (PRB: Physical RB), subcarrier group (SCG: Sub-Carrier Group), Resource Element Group (REG), PRB pair, RB pair and the like.

Further, the resource block may be comprised of a single or a plurality of resource elements (RE: Resource Element). For example, 1 RE may be a radio resource region of 1 subcarrier and 1 symbol.

In addition, structures of the above-mentioned radio frame, subframe, slot, mini-slot and symbol are only illustrative. For example, it is possible to modify, in various manners, configurations of the number of subframes included in the radio frame, the number of slots per subframe or radio frame, the number of mini-slots included in the slot, the numbers of symbols and RBs included in the slot or mini-slot, the number of subcarriers included in the RB, the number of symbols inside the TTI, the symbol length, the cyclic prefix (CP) length and the like.

Further, the information, parameter and the like explained in the present Description may be expressed by an absolute value, may be expressed by a relative value from a predetermined value, or may be expressed by another corresponding information. For example, the radio resource may be indicated by a predetermined index. Further, equations using these parameters and the like may be different from those explicitly disclosed in the present Description.

The names used in the parameter and the like in the present Description are not restrictive in any respects. For example, it is possible to identify various channels (PUCCH (Physical Uplink Control Channel), PDCCH (Physical Downlink Control Channel) and the like) and information elements, by any suitable names, and therefore, various names assigned to these various channels and information elements are not restrictive in any respects.

The information, signal and the like explained in the present Description may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the information, signal and the like are capable of being output from a higher layer to a lower layer, and/or from the lower layer to the higher layer. The information, signal and the like may be input and output via a plurality of network nodes.

The input/output information, signal and the like may be stored in a particular place (e.g. memory), or may be managed with a management table. The input/output information, signal and the like are capable of being rewritten, updated or edited. The output information, signal and the like may be deleted. The input information, signal and the like may be transmitted to another apparatus.

Notification of the information is not limited to the Aspect/Embodiment described in the present Description, and may be performed by another method. For example, notification of the information may be performed using physical layer signaling (e.g. Downlink Control Information (DCI), Uplink Control Information (UCI)), higher layer signaling (e.g. RRC (Radio Resource Control) signaling, broadcast information (Master Information Block (MIB), System Information Block (SIB) and the like), MAC (Medium Access Control) signaling), other signals, or combination thereof.

In addition, physical layer signaling may be called L1/L2 (Layer 1/Layer 2) control information (L1/L2 control signal), L1 control information (L1 control signal) and the like. Further, RRC signaling may be called RRC message, and for example, may be RRC Connection Setup message, RRC Connection Reconfiguration message, and the like. Furthermore, for example, MAC signaling may be notified by MAC Control Element (MAC CE).

Further, notification of predetermined information (e.g. notification of "being X") is not limited to notification that is performed explicitly, and may be performed implicitly (e.g. notification of the predetermined information is not performed, or by notification of different information).

The decision may be made with a value ("0" or "1") expressed by 1 bit, may be made with a Boolean value represented by true or false, or may be made by comparison with a numerical value (e.g. comparison with a predetermined value).

Irrespective of that the software is called software, firmware, middle-ware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using wired techniques (coaxial cable, optical fiber cable, twisted pair, Digital Subscriber Line (DSL) and the like) and/or wireless techniques (infrared, microwave and the like), these wired techniques and/or wireless techniques are included in the definition of the transmission medium.

The terms of "system" and "network" used in the present Description are used interchangeably.

In the present Description, the terms of "Base Station (BS)", "radio base station", "eNB", "gNB", "cell", "sector", "cell group", "carrier" and "component carrier" are capable of being used interchangeably. There is the case where the base station is called by the terms of fixed station, NodeB, eNodeB (eNB), access point, transmission point, reception point, femto-cell, small cell and the like.

The base station is capable of accommodating a single or a plurality of (e.g. three) cells (also called the sector). When the base station accommodates a plurality of cells, the entire coverage area of the base station is capable of being divided into a plurality of smaller areas, and each of the smaller areas is also capable of providing communication services by a base station sub-system (e.g. small base station (RRH: Remote Radio Head) for indoor use). The term of "cell" or "sector" refers to a part or the whole of coverage area of the base station and/or base station sub-system that performs communication services in the coverage.

In the present Description, the terms of "Mobile Station (MS)", "user terminal", "User Equipment (UE)", and "terminal" are capable of being used interchangeably. There is the case where the base station is called by the terms of fixed station, NodeB, eNodeB (eNB), access point, transmission point, reception point, femto-cell, small cell and the like.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms, by the person skilled in the art.

Further, the radio base station in the present Description may be read with the user terminal. For example, each Aspect/Embodiment of the present invention may be applied to a configuration where communication between the radio base station and the user terminal is replaced with communication among a plurality of user terminals (D2D: Device-to-Device). In this case, the functions that the above-mentioned radio base station 10 has may be the configuration that the user terminal 20 has. Further, the words of "up", "down" and the like may be read with "side". For example, the uplink channel may be read with a side channel.

Similarly, the user terminal in the present Description may be read with the radio base station. In this case, the functions that the above-mentioned user terminal 20 has may be the configuration that the radio base station 10 has.

In the present Description, particular operation performed by the base station may be performed by the upper node in some case. In a network comprised of a single or a plurality of network nodes having the base station, it is obvious that various operations performed for communication with the terminal are performed by the base station, one or more network nodes (E.g. MME (Mobility Management Entity), S-GW (Serving-Gateway) and the like are considered, but the invention is not limited thereto) except the base station, or combination thereof.

Each Aspect/Embodiment explained in the present Description may be used alone, may be used in combination, or may be switched and used according to execution. Further, with respect to the processing procedure, sequence, flowchart and the like of each Aspect/Embodiment explained in the present Description, unless there is a contradiction, the order may be changed. For example, with respect to the methods explained in the present Description, elements of various steps are presented in illustrative order, and are not limited to the presented particular order.

Each Aspect/Embodiment explained in the present Description may be applied to LTE (Long Term. Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Registered Trademark) (Global System for Mobile communications), CDMA 2000, UMB (Ultra Mobile Broadband), IEEE 802.11 (Wi-Fi (Registered Trademark)), IEEE 802.16 (WiMAX (Registered Trademark)), IEEE 802.20, UWB (Ultra-WideBand), Bluetooth (Registered Trademark), system using another proper radio communication method and/or the next-generation system extended based thereon.

The description of "based on" used in the present Description does not mean "based on only", unless otherwise specified. In other words, the description of "based on" means both of "based on only" and "based on at least".

Any references to elements using designations of "first", "second" and the like used in the present Description are not intended to limit the amount or order of these elements overall. These designations are capable of being used in the present Description as the useful method to distinguish between two or more elements. Accordingly, references of first and second elements do not mean that only two elements are adopted, or that the first element should be prior to the second element in any manner.

There is the case where the term of "determining" used in the present Description includes various types of operation. For example, "determining" may be regarded as "determining" calculating, computing, processing, deriving, investigating, looking up (e.g. search in a table, database or another data structure), ascertaining and the like. Further, "determining" may be regarded as "determining" receiving (e.g. receiving information), transmitting (e.g. transmitting information), input, output, accessing (e.g. accessing data in memory) and the like. Furthermore, "determining" may be regarded as "determining" resolving, selecting, choosing, establishing, comparing and the like. In other words, "determining" may be regarded as "determining" some operation.

The terms of "connected" and "coupled" used in the present Description or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. For example, "connection" may be read with "access". In the case of using in the present Description, it is possible to consider that two elements are mutually "connected" or "coupled", by using one or more electric wires, cable and/or print electric connection, and as some non-limited and non-inclusive examples, electromagnetic energy having wavelengths in a radio frequency region, microwave region and/or light (both visible and invisible) region and the like.

In the case of using "including", "comprising" and modifications thereof in the present Description and the scope of the claims, as in the term of "provided with", these terms are intended to be inclusive. Further, the term of "or" used in the present Description and the scope of the claims is intended to be not exclusive OR.

As described above, the present invention is specifically described, but it is obvious to a person skilled in the art that the invention is not limited to the Embodiment described in the present Description. The invention is capable of being carried into practice as modified and changed aspects without departing from the subject matter and scope of the invention defined by the descriptions of the scope of the claims. Accordingly, the descriptions of the present Description are intended for illustrative explanation, and do not have any restrictive meaning to the invention.

The present application is based on Japanese Patent Application No. 2017-023400 filed on Feb. 10, 2017, entire content of which is expressly incorporated by reference herein.

The invention claimed is:

1. A terminal comprising:
a processor that selects a new beam if beam quality is worse than a threshold; and
a transmitter that performs a transmission based on an index related to the new beam,
wherein the processor increases, for a period during which a condition is met after the transmission, transmit power for an uplink control channel as compared with before the transmission.

2. The terminal according to claim 1, wherein the processor determines an increase amount of the transmit power from that before the transmission based on higher layer signaling.

3. A radio communication method for a terminal, comprising:
selecting a new beam if beam quality is worse than a threshold;
performing a transmission based on an index related to the new beam; and
increasing, for a period during which a condition is met after the transmission, transmit power for an uplink control channel as compared with before the transmission.

4. A system comprising:
a terminal that comprises:
a processor that selects a new beam if beam quality is worse than a threshold; and
a transmitter that performs a transmission based on an index related to the new beam,
wherein the processor increases, for a period during which a condition is met after the transmission, transmit power for an uplink control channel as compared with before the transmission; and
a base station that comprises:
a receiver that receives the transmission.

* * * * *